US007362682B2

(12) United States Patent
Shingai et al.

(10) Patent No.: US 7,362,682 B2
(45) Date of Patent: Apr. 22, 2008

(54) METHOD FOR RECORDING DATA IN AN OPTICAL RECORDING DISC AND AN APPARATUS FOR RECORDING DATA IN AN OPTICAL RECORDING DISC

(75) Inventors: Hiroshi Shingai, Tokyo (JP); Tatsuya Kato, Tokyo (JP); Hideki Hirata, Tokyo (JP)

(73) Assignee: TDK Corporation, Tokyo (JP)

( * ) Notice: Subject to any disclaimer, the term of this patent is extended or adjusted under 35 U.S.C. 154(b) by 566 days.

(21) Appl. No.: 10/927,539

(22) Filed: Aug. 26, 2004

(65) Prior Publication Data
US 2005/0063273 A1     Mar. 24, 2005

(30) Foreign Application Priority Data
Aug. 27, 2003   (JP)   ............................. 2003-302313

(51) Int. Cl.
*G11B 7/00*     (2006.01)
(52) U.S. Cl. ..................................... 369/59.1
(58) Field of Classification Search ............. 369/59.11, 369/59.12, 47.5, 47.51, 47.52, 59.1
See application file for complete search history.

(56) References Cited

U.S. PATENT DOCUMENTS 6,914,866 B2 *   7/2005   Narumi et al. ............ 369/59.11
7,130,256 B2 *   10/2006   Toda et al. ............... 369/59.11

FOREIGN PATENT DOCUMENTS

| JP | 08-287465 | 11/1996 |
|---|---|---|
| JP | 09305971 | 11/1997 |
| JP | 2001-176072 | 6/2001 |

* cited by examiner

*Primary Examiner*—Nabil Hindi
(74) *Attorney, Agent, or Firm*—Seed IP Law Group PLLC

(57) ABSTRACT

A method for recording data in an optical recording disc including a substrate and a recording layer formed on the substrate and containing a phase change material as a primary component is constituted so that data can be recorded therein and data recorded therein can be erased by projecting thereonto at a high linear velocity equal to or higher than a predetermined linear velocity a laser beam whose power is modulated in accordance with a pulse train pattern including a plurality of kinds of unit pulse train patterns each having at least recording pulses whose levels are set to a recording power and bottom pulses whose levels are set to a bottom power onto the recording layer and forming a plurality of recording marks having different lengths in the recording layer, wherein among the plurality of kinds of unit pulse train patterns used for forming recording marks having different lengths those other than the unit pulse train pattern used for forming the shortest recording mark are determined so that they include recording pulses in a number corresponding to the length of the recording mark to be formed, that corresponding recording pulses included therein have a common pulse width and that each of them includes a bottom pulse whose pulse width is determined in accordance with the length of the recording mark to be formed at the end thereof. According to this method for recording data in an optical recording disc, it is possible to reduce jitter of a reproduced signal even when data are recorded at a low linear recording velocity in the recording layer designed to be suitable for recording data therein at a high linear recording velocity.

20 Claims, 9 Drawing Sheets

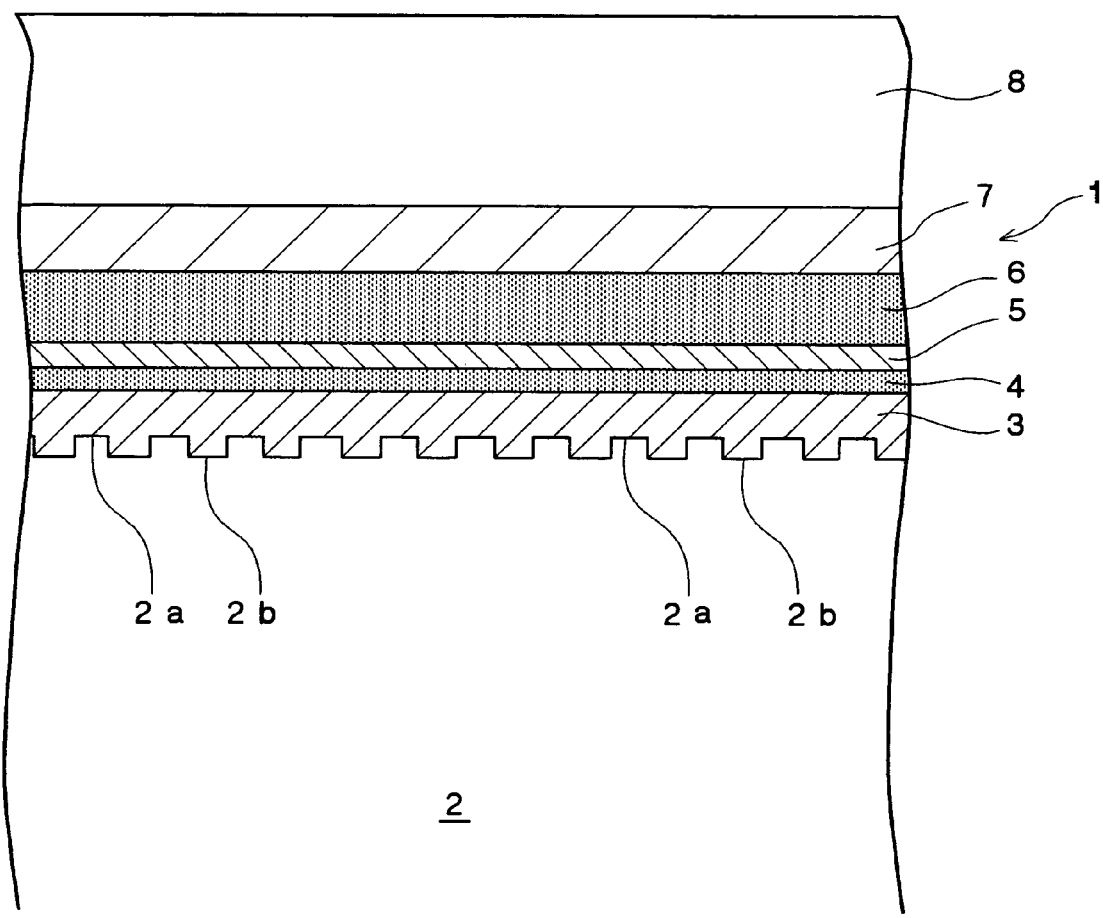

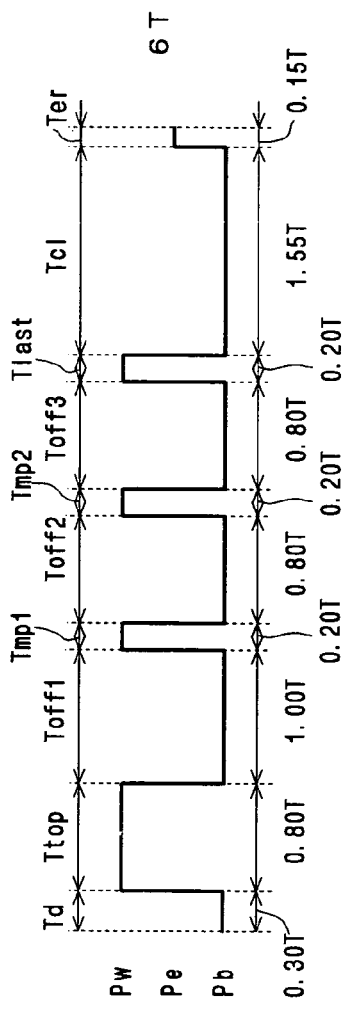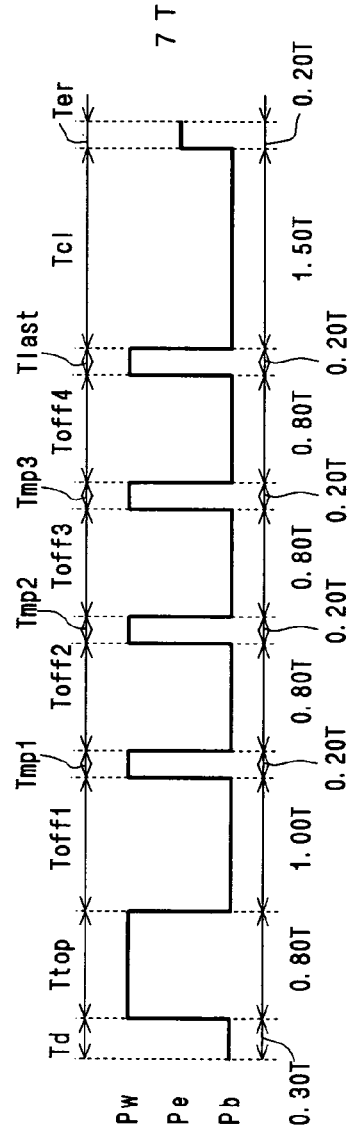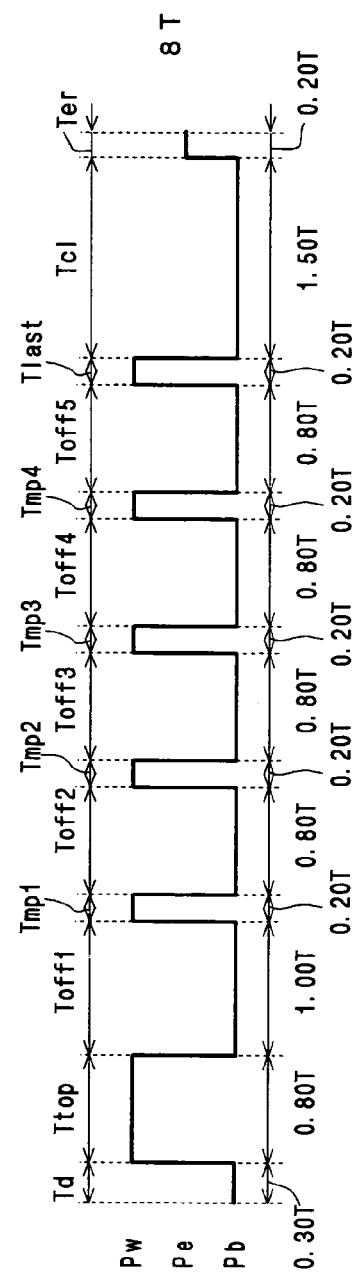

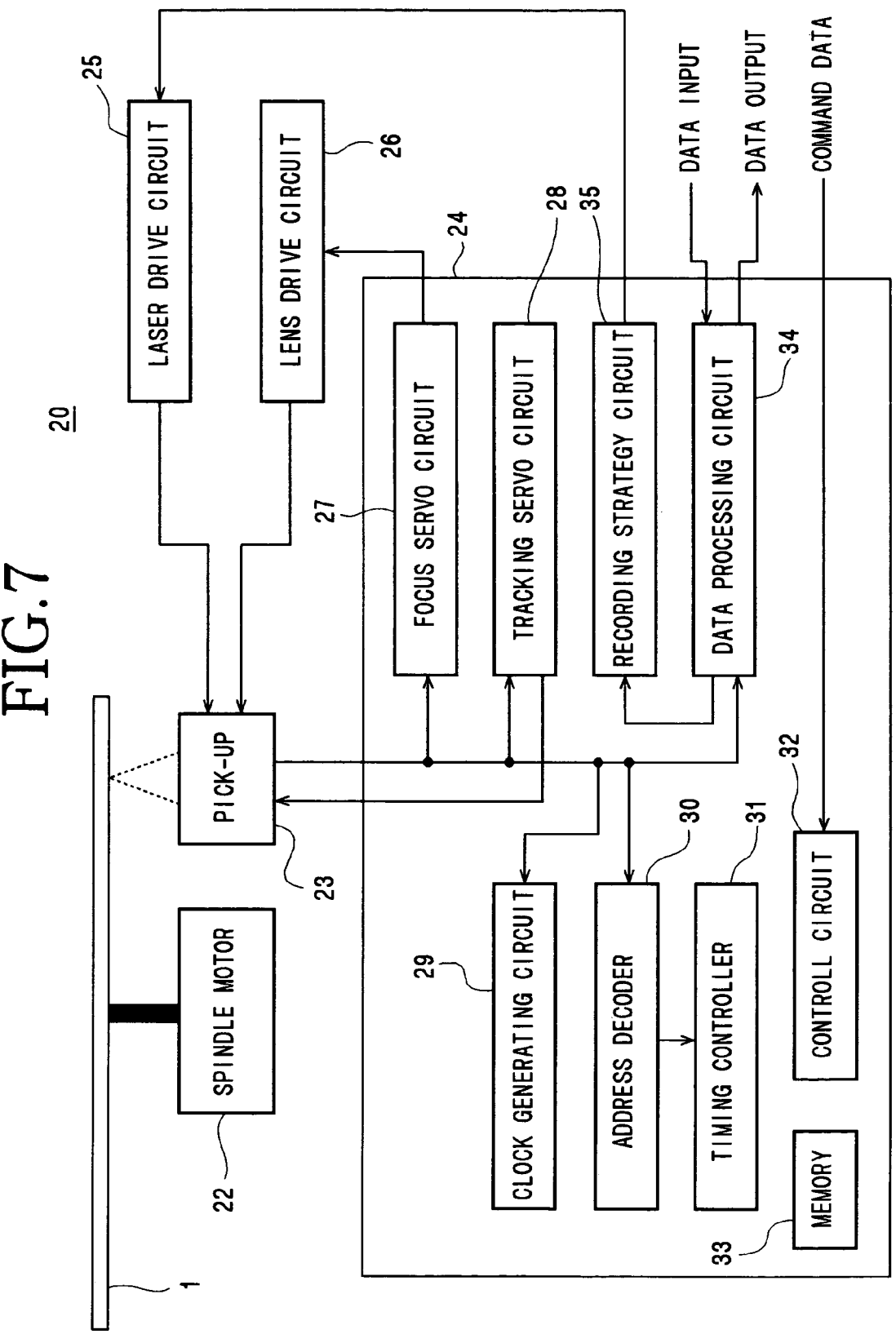

METHOD FOR RECORDING DATA IN AN OPTICAL RECORDING DISC AND AN APPARATUS FOR RECORDING DATA IN AN OPTICAL RECORDING DISC

BACKGROUND OF THE INVENTION

The present invention relates to a method for recording data in an optical recording disc including a recording layer containing a phase change material and an apparatus for recording data therein an optical recording disc, and in particular, to a method for recording data in an optical recording disc and an apparatus for recording data therein, which can reduce jitter of a reproduced signal even when data are recorded at a low linear recording velocity in a recording layer designed to be suitable for recording data therein at a high linear recording velocity.

DESCRIPTION OF THE PRIOR ART

Optical recording discs such as the CD, DVD and the like have been widely used as recording media for recording digital data. Recently, a next-generation type optical recording disc having high recording density and a high data transfer rate has been proposed.

These optical recording discs can be roughly classified into write-once type optical recording discs such as the CD-R and DVD-R that enable writing but not rewriting of data and data rewritable type optical recording discs such as the CD-RW and DVD-RW that enable rewriting of data.

Among these optical recording discs, the write-once type optical recording disc employs a phase change material as the material for forming the recording layer and data are recorded in the recording layer utilizing the difference in the reflectivity between the phase change material in a crystal state and the phase change material in an amorphous state.

Specifically, the entire surface of the recording layer is in a crystal phase when data are not recorded therein and when data are recorded, the phase of the recording layer is locally changed to an amorphous phase, thereby forming a recording mark.

When a recording mark is to be formed in a recording layer of an optical recording disc to record data therein, a laser beam having a power modulated in accordance with recording marks to be formed is projected onto the recording layer.

A method for modulating the power of the laser beam projected onto the recording layer is called a recording strategy.

Concretely, as described in Japanese Patent Application Laid Open No. 9-305971, when data are to be recorded in a recording layer of an optical recording disc, a laser beam whose power is modulated by a pulse train pattern including a unit pulse train pattern having a combination of a recording pulse whose power is set to a recording power Pw and a bottom pulse whose power is set to a bottom power Pb is projected onto a predetermined region of the recording layer to heat the region of the recording layer to a temperature equal to or higher than the melting point of the phase change material and the region of the recording layer is then quickly cooled, whereby the phase of the region is changed to an amorphous state and a recording mark is formed.

On the other hand, when data recorded in a recording layer of an optical recording disc are to be erased, a laser beam whose power is modulated by a pulse train pattern including a unit pulse train pattern into which an erasing pulse whose power is set to an erasing power Pe is inserted is projected onto a region in which a recording mark is formed to heat the region of the recording layer irradiated with the laser beam to a temperature equal to or higher than the crystallization temperature of the phase change material and the amorphous region is crystallized, thereby erasing the recording mark.

Recently, a need has arisen for the development of an optical recording disc in which data can be recorded at an extremely high linear recording velocity equal to or higher than about 19 m/sec but in which data can also be recorded at a low linear recording velocity equal to or lower than about 10 m/sec.

In response to this need, there has been developed an optical recording disc whose recording layer is formed of a material that readily crystallizes and in which data can be recorded at an extremely high linear recording velocity equal to or higher than about 19 m/sec and data can be erased.

However, a problem remains. Specifically, although data can be recorded at a high linear recording velocity and data can be erased in an optical recording disc whose recording layer is formed of a material that readily crystallizes, jitter of the reproduced signal becomes worse in the case where data are recorded at a low linear recording velocity.

It is reasonable to assume that this is because although a region of a recording layer melted by irradiation with a laser beam of a recording power Pw is more quickly cooled when the power of the laser beam is switched from the recording power Pw to a bottom power Pb in the case of a low linear recording velocity than in the case of a high linear recording velocity, a part of the region of the recording layer is again crystallized since the recording layer readily crystallizes, making it impossible to form a recording layer in a desired manner.

SUMMARY OF THE INVENTION

It is therefore an object of the present invention to provide a method for recording data in an optical recording disc and an apparatus for recording data therein, which can reduce jitter of a reproduced signal even when data are recorded at a low linear recording velocity in a recording layer designed to be suitable for recording data therein at a high linear recording velocity.

The above and other objects of the present invention can be accomplished by a method for recording data in an optical recording disc including a substrate and a recording layer formed on the substrate and containing a phase change material as a primary component and constituted so that data can be recorded therein and data recorded therein can be erased by projecting thereonto at a high linear velocity equal to or higher than a predetermined linear velocity a laser beam whose power is modulated in accordance with a pulse train pattern including a plurality of kinds of unit pulse train patterns each having at least a recording pulse(s) whose level(s) is set to a recording power and a bottom pulse(s) whose level(s) is set to a bottom power onto the recording layer and forming a plurality of recording marks having different lengths in the recording layer, wherein among the plurality of kinds of unit pulse train patterns used for forming recording marks having different lengths those other than the unit pulse train pattern used for forming the shortest recording mark are determined so that they include recording pulses in a number corresponding to the length of the recording mark to be formed, that corresponding recording pulses included therein have a common pulse width and that each of them includes a bottom pulse whose pulse width is determined in accordance with the length of the recording mark to be formed at the end thereof.

In this specification, a pulse whose level is raised to a level corresponding to the recording power is referred to as "a recording pulse" and a pulse whose level is lowered to a level corresponding to the bottom power is referred to as "a bottom pulse".

In the present invention, the optical recording disc includes at least the substrate and the recording layer formed on the substrate.

In the present invention, the recording layer contains a phase change material as a primary component and data are recorded in and data are reproduced from the recording layer utilizing the difference in the reflectivity between the phase change material in a crystalline state and that in an amorphous state.

In the present invention, when data are recorded in the recording layer, a laser beam whose power is modulated in accordance with a pulse train pattern including a unit pulse train pattern having at least recording pulses whose levels are set to a recording power and bottom pulses whose levels are set to a bottom power is projected onto the recording layer to heat a region of the recording layer irradiated with the laser beam to a temperature equal to or higher than the melting point of the phase change material and the region of the recording layer irradiated with the laser beam is then quickly cooled by switching the power of the laser beam from the recording power to the bottom power, whereby the phase of the region is changed to the amorphous state and a recording mark is formed.

On the other hand, in the present invention, when a recording mark formed in the recording layer is erased and data recorded therein are erased, the recording mark is erased by employing a pulse train pattern including a unit pulse train pattern having pulses whose levels are set to erasing power, in addition to the pulses whose levels are set to the recording power or the bottom power, projecting a laser beam whose power is set to the erasing power onto a region in which the recording mark is formed to heat the region of the recording layer irradiated with the laser beam to a temperature equal to or higher than the crystallization temperature of a phase change material and crystallizing the amorphous region of the recording layer.

In the present invention, in the case where data are to be recorded in a recording layer of an optical recording disc by forming a plurality of recording marks having different lengths therein, unit pulse train patterns other than the unit pulse train pattern used for forming the shortest recording mark are determined so that they include recording pulses in a number corresponding to the length of the recording mark to be formed, that corresponding recording pulses included therein have a common pulse width and that each of them includes a bottom pulse whose pulse width is determined in accordance with the length of the recording mark to be formed at the end thereof and a laser beam whose power is modulated by a pulse train pattern including a combination of the thus determined unit pulse train patterns is projected onto the recording layer of the optical recording disc to record data therein.

In a study done by the inventors of the present invention, it was found that in the case where data were to be recorded by modulating the power of a laser beam by the pulse train pattern including the unit pulse train patterns each having such regularity, projecting the thus power-modulated laser beam onto the recording layer of the optical recording disc and forming a plurality of recording marks having different lengths, even when data were recorded in the recording layer of an optical recording disc at a low linear recording velocity equal to or lower than about 10 m/sec, jitter of a reproduced signal could be markedly reduced.

It is not altogether clear why jitter of a reproduced signal can be markedly reduced even when data are recorded in the recording layer of an optical recording disc at a low linear recording velocity equal to or lower than about 10 m/sec. However, it is reasonable to assume that the reason for these findings is as follows. Specifically, in the case where data are recorded by modulating the power of a laser beam by the pulse train pattern including the unit pulse train patterns each having such regularity, projecting the thus power-modulated laser beam onto the recording layer of the optical recording disc, and forming a plurality of recording marks having different lengths, the heating of the recording layer caused by projecting the laser beam whose power is modulated by the recording pulses having a level corresponding to the recording power and the cooling of the recording layer caused by projecting the laser beam whose power is modulated by the last bottom pulse having a level corresponding to the bottom power are properly balanced and, as a result, recording marks having desired sizes can be formed in the recording layer of the optical recording disc.

Therefore, according to the present invention, it is possible to markedly reduce jitter of a reproduced signal even when data are recorded at a low linear velocity in a recording layer of an optical recording disc designed to be suitable for recording data therein at a high linear recording velocity.

In a preferred aspect of the present invention, the unit pulse train patterns other than the unit pulse train pattern used for forming the shortest recording mark are determined so that the pulse width of the bottom pulse included at the end thereof is longer as the length of a recording mark to be formed is shorter.

In the case where the length of a recording mark to be formed is short, since the number of recording pulses becomes small, an amount of heat applied to the recording layer becomes small and a region to be melted tends to become small. However, according to the present invention, since each of the unit pulse train patterns is determined in such a case so that the pulse width of the bottom pulse included at the end thereof becomes longer, a melted region of the recording layer is quickly cooled to prevent the melted region from being re-crystallized and it is therefore possible to form a recording mark having a desired length.

On the other hand, in the case where the length of a recording mark to be formed is long, since the number of recording pulses becomes great, the amount of heat applied to the recording layer becomes large and the region melted tends to become large. However, according to the present invention, since each of the unit pulse train patterns is determined in such a case so that the pulse width of the bottom pulse included at the end thereof becomes shorter, re-crystallization of a melted region spreading over a broader area than the recording mark to be formed is promoted, thereby adjusting the final size of the region whose phase is to be changed to the amorphous phase. As a result, it is possible to form a recording mark in a desired manner.

Therefore, according to the present invention, it is possible to form a recording mark in a desired manner irrespective of the length of the recording mark and jitter of a reproduced signal can be markedly reduced.

In a preferred aspect of the resent invention, each of the unit pulse train patterns other than the unit pulse train pattern used for forming the shortest recording mark is determined so that when a recording mark having a length equal to n times a clock frequency T, where n is a positive integer, is to be formed, it includes (n−2) recording pulses.

In a study done by the inventors of the present invention, it was found that in the case where the power of a laser beam was modulated by a pulse train pattern including a combination of unit pulse train patterns determined so that those other than the unit pulse train pattern used for forming the shortest recording mark included recording pulses in a number corresponding to the length of the recording mark to be formed, corresponding recording pulses included therein had common pulse lengths and each of them included a last bottom pulse having the pulse width determined in accordance with the length of a recording mark to be formed at the end thereof and included (n−2) recording pulses when a recording mark having a length equal to n times a clock frequency T and the thus power-modulated laser beam was projected onto the recording layer of the optical recording disc, thereby recording data therein, even when data were recorded using the unit pulse train pattern including the same number of recording pulses irrespective of the linear recording velocity, a reproduced signal having low jitter could be obtained.

It is reasonable to assume that this is because in the case where each of the unit pulse train patterns other than the unit pulse train pattern used for forming the shortest recording mark includes (n−2) recording pulses when a recording mark having a length equal to n times a clock frequency T is to be formed, data can be recorded at a high linear recording velocity in the recording layer of the optical recording disc 1 while preventing the amount of heat applied to the region of the recording layer in which a recording mark is to be formed from running short and data can be recorded at a low linear recording velocity in the recording layer of the optical recording disc while preventing the amount of heat applied to the region of the recording layer in which a recording mark is to be formed from becoming excessive.

Therefore, according to this preferred aspect of the present invention, it is unnecessary to change the number of recording pulses included in the unit pulse train pattern in accordance with the linear recording velocity and even in the case where the linear recording velocity differs greatly depending upon the position of a laser beam projected onto an optical recording disc. For example, in the case where the optical recording disc is rotated at a constant angular velocity, it is unnecessary to change the number of recording pulses included in the unit pulse train pattern. Therefore, since it is unnecessary to conduct processing for changing the number of recording pulses included in the unit pulse train pattern, the configuration of a circuit for controlling the pulse train pattern can be simplified.

Further, according to this preferred aspect of the present invention, in the case where data are recorded in a recording layer of an optical recording disc at a low linear recording velocity, since data can be recorded in the recording layer by projecting a laser beam whose power is modulated in accordance with a pulse train pattern having a unit pulse train pattern including the same number of recording pulses as those in the case where data are recorded at a high linear recording velocity, it is possible to effectively apply heat to a region of a recording layer in which a recording mark is to be formed and, therefore, the recording power of the laser beam can be set to a low level when data are recorded in the recording layer at a low linear recording velocity.

In the present invention, the phase change material for forming a recording layer of an optical recording disc is not particularly limited and the recording layer contains a phase change material such as Sb, Te, Ge, Tb, Ag, In and the like as a primary component and preferably contains a phase change material such as Sb, Te, Ge and Tb. It is particularly preferable for the element contained in the recording layer of an optical recording disc represented by a general formula: $Sb_aTe_bGe_cTb_d$ to have such a composition that a is equal to or larger than 63 and equal to or smaller than 78, c is equal to or larger than 2 and equal to or smaller than 10, d is equal to or larger than 3 and equal to or smaller than 15, (a+d) is equal to or larger than 75 and equal to or smaller than 82 and a/b is equal to or larger than 3.3 and equal to or smaller than 4.9.

The phase change material represented by the general formula: $Sb_aTe_bGe_cTb_d$ changes from an amorphous phase to a crystalline phase in an extremely short time, namely, has an extremely high crystallization speed and, therefore, data can be recorded in the recording layer and data recorded in the recording layer can be erased at an extremely high linear recording velocity, for example, a linear recording velocity equal to or higher than about 19 m/sec.

Further, since the phase change material represented by the general formula: $Sb_aTe_bGe_cTb_d$ has a high crystallization temperature at which it changes from an amorphous phase to a crystalline phase, the thermal stability thereof in an amorphous phase is high.

The phase change material represented by the general formula: $Sb_aTe_bGe_cTb_d$ has such properties because it is low in Sb content and contains Tb. Tb serves to increase the crystallization speed and the crystallization temperature of the phase change material and the crystallization speed and the crystallization temperature of the phase change material can be increased by replacing a part of Sb with Tb.

In the present invention, it is preferable to form a recording layer of an optical recording disc so as to have a thickness of 2 nm to 40 nm, more preferably to form a recording layer of an optical recording disc so as to have a thickness of 4 nm to 30 nm and particularly preferably to form a recording layer of an optical recording disc so as to have a thickness of 5 nm to 20 nm.

In the case where the thickness of a recording layer of an optical recording disc is smaller than 2 nm, the difference in the optical constants between before and after data recording becomes small and a reproduced signal having a high level (C/N ratio) cannot be obtained when data are reproduced. On the other hand, in the case where the thickness of a recording layer of an optical recording disc is larger than 40 nm, an amount of heat necessary for recording data increases, the recording sensitivity becomes worse and a recording mark becomes hard to be formed.

In the present invention, an optical recording disc preferably has such a property that a reflectivity Ri of a region in which a recording mark is formed by projecting a laser beam of a wavelength λ and whose power is set to a recording power Pw onto a recording layer at an extremely high linear recording velocity via an objective lens having a numerical aperture NA so as to have a length equal to or longer than λ/NA and a reflectivity Re of a region of a recording layer when a recording mark formed therein is erased by projecting a laser beam having an erasing power Pe onto the region satisfy that Re is equal to or larger than 0.95*Ri.

In a further preferred aspect of the present invention, data are recorded in a recording layer of an optical recording disc by projecting a laser beam having a wavelength of 350 nm to 450 nm onto the recording layer.

In a further preferred aspect of the present invention, data are recorded in a recording layer of an optical recording disc by employing an objective lens and a laser beam whose numerical aperture NA and wavelength λ satisfy λ/NA≦640 nm, and projecting the laser beam onto the recording layer of the optical recording disc via the objective lens.

The above and other objects of the present invention can be also accomplished by an apparatus for recording data in an optical recording disc including a substrate and a recording layer formed on the substrate and containing a phase change material as a primary component and constituted so that data can be recorded therein and data recorded therein can be erased by projecting a laser beam thereonto at a high linear velocity equal to or higher than a predetermined linear velocity, which apparatus for recording data in an optical recording disc comprises a laser beam projecting means for projecting a laser beam whose power is modulated in accordance with a pulse train pattern including a unit pulse train pattern having at least a recording pulse(s) whose level(s) is set to a recording power and a bottom pulse(s) whose level(s) is set to a bottom power onto the recording layer of the optical recording disc, wherein among the plurality of kinds of unit pulse train patterns used for forming recording marks having different lengths those other than the unit pulse train pattern used for forming the shortest recording mark are determined so that they include recording pulses in a number corresponding to the length of the recording mark to be formed, that corresponding recording marks included therein have a common pulse width and that each of them includes a bottom pulse whose pulse width is determined in accordance with the length of the recording mark to be formed at the end thereof and the laser beam projecting means is adapted for modulating the power of the laser beam in accordance with the pulse train pattern including a combination of the thus determined unit pulse train patterns.

In a preferred aspect of the present invention, the unit pulse train patterns other than the unit pulse train pattern used for forming the shortest recording mark are determined so that the pulse width of the bottom pulse included at the end thereof is longer as the length of a recording mark to be formed is shorter.

In a further preferred aspect of the present invention, each of the unit pulse train patterns other than the unit pulse train pattern used for forming the shortest recording mark is determined so that when a recording mark having a length equal to n times a clock frequency T, where n is a positive integer, is to be formed, it includes (n−2) recording pulses.

The above and other objects and features of the present invention will become apparent from the following description made with reference to the accompanying drawings.

BRIEF DESCRIPTION OF THE DRAWINGS

FIG. 2 is a schematic enlarged cross-sectional view of a portion indicated by A in FIG. 1.

FIGS. 6(a)-(c) is a diagram showing a unit pulse train pattern used for recording data in an optical recording disc in a data recording method which is a preferred embodiment of the present invention.

FIG. 7 is a block diagram of an apparatus for recording data in an optical recording disc which is a preferred embodiment of the present invention.

DESCRIPTION OF THE PREFERRED EMBODIMENTS

Figure 1:
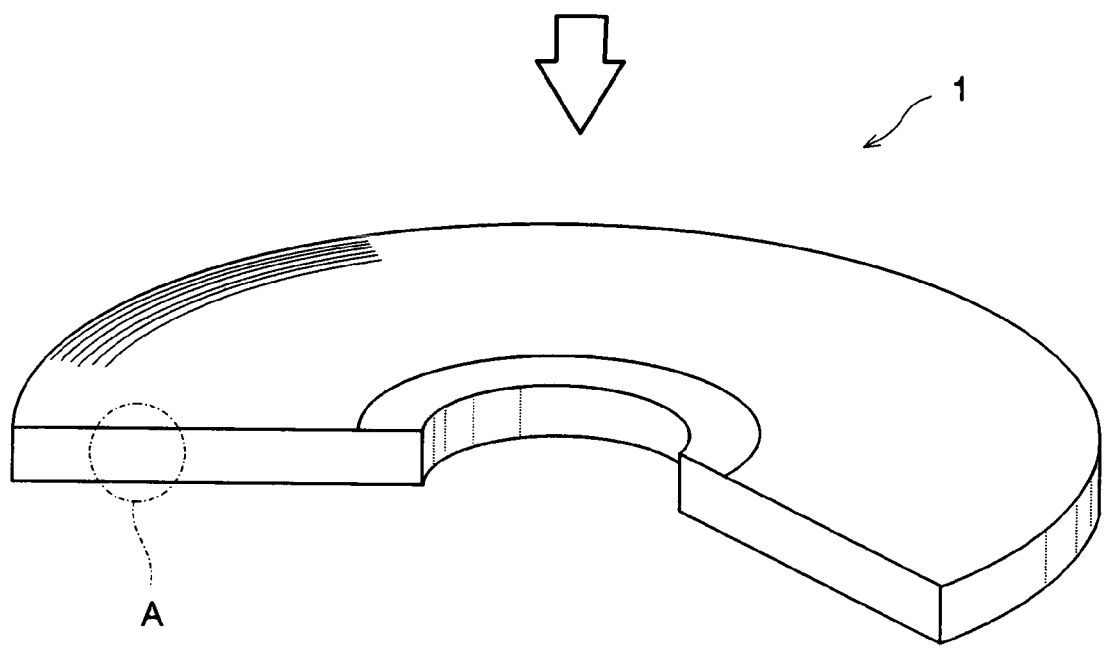
FIG. 1 is a schematic perspective view showing an optical recording disc which is a preferred embodiment of the present invention.
Figure 3A:
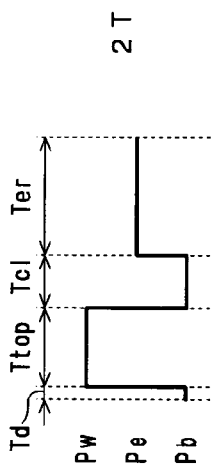
FIGS. 3(a)-(d) is a diagram showing a unit pulse train pattern used for recording data in an optical recording disc in a data recording method which is a preferred embodiment of the present invention.
Figure 3B:
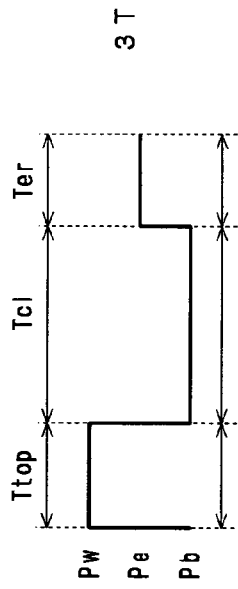
Figure 3C:
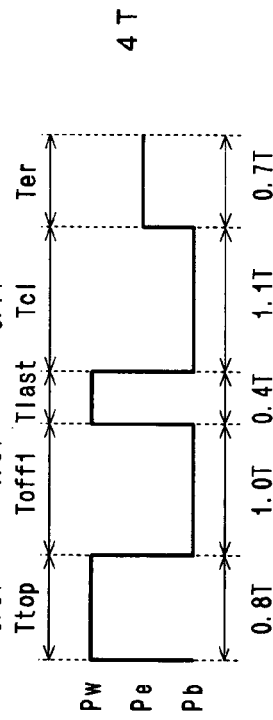
Figure 3D:
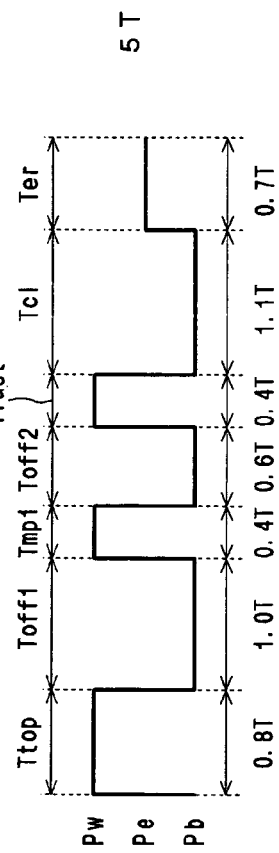

FIG. 1 is a schematic perspective view showing an optical recording disc which is a preferred embodiment of the present invention and FIG. 2 is a schematic enlarged cross-sectional view of a portion indicated by A in FIG. 1.

As shown in FIG. 1, the optical recording disc 1 according to this embodiment is disc-like shaped and a laser beam having a wavelength λ of 350 nm to 450 nm is projected from a direction indicated by an arrow in FIGS. 1 and 2 onto the optical recording disc 1 via an objective lens having a numerical aperture NA satisfying λ/NA≦640 nm.

As shown in FIG. 2, the optical recording disc 1 according to this embodiment includes a substrate 2, a reflective layer 3 formed on the surface of the substrate 2, a second dielectric layer 4 formed on the surface of the reflective layer 3, a recording layer 5 formed on the surface of the second dielectric layer 4 as a phase change film, a first dielectric layer 6 formed on the surface of the recording layer 5, a heat radiation layer 7 formed on the surface of the first dielectric layer 6 and a light transmission layer 8 formed on the surface of the heat radiation layer 7.

The substrate 2 serves as a mechanical support of the optical recording disc 1.

The material for forming the substrate 2 is not particularly limited insofar as the substrate 2 can serve as the support of the optical recording medium 1. The substrate 2 can be formed of glass, ceramic, resin or the like. Among these, resin is preferably used for forming the substrate 2 since resin can be easily shaped. Illustrative examples of resins suitable for forming the support substrate 11 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 2 from the viewpoint of easy processing, optical characteristics and the like and in this embodiment, the substrate 2 is formed of polycarbonate resin.

In this embodiment, the substrate 2 has a thickness of about 1.1 mm.

In this embodiment, since the laser beam is projected onto the recording layer 5 via the light transmission layer 8 located opposite to the substrate 2, it is unnecessary for the substrate 2 to have a light transmittance property.

As shown in FIG. 2, grooves 2a and lands 2b are alternately and spirally formed on the surface of the substrate 2. The grooves 2a and/or lands 21b formed on the surface of the substrate 2 serve as a guide track for the laser beam when data are to be recorded in the recording layer 5 or when data are to be reproduced from the recording layer 5.

As shown in FIG. 2, the reflective layer 3 is formed on the surface of the substrate 2.

The reflective layer 3 serves to reflect the laser beam projected onto the recording layer 5 via the light transmission layer 8 so as to emit it from the light transmission layer 8 and effectively radiate heat generated in the recording layer 5 by the irradiation with the laser beam.

The thickness of the reflective layer 3 is not particularly limited but it is preferable to form the reflective layer 3 to have a thickness of 10 to 300 nm and is more preferable to form it to have a thickness of 20 to 200 nm.

The material for forming the reflective layer 3 is not particularly limited insofar as it can reflect the laser beam and the reflective layer 3 can be formed of Mg, Al, Ti, Cr, Fe, Co, Ni, Cu, Zn, Ge, Ag, Pt, Au or the like. Among these, a metal material such as Al, Au, Ag and Cu or an alloy containing at least one of these metals such as an alloy of Ag and Cu is preferably used for forming the reflective layer 3 because it has high reflective coefficient.

The reflective layer 12 can be formed on the substrate 2 by a gas phase growth process using chemical species containing elements for forming the reflective layer 3. Illustrative examples of the gas phase growth processes include vacuum deposition process, sputtering process and the like.

As shown in FIG. 2, the second dielectric layer 4 is formed on the surface of the reflective layer 3.

The second dielectric layer 4 and the first dielectric layer 6 serve to mechanically and chemically protect the recording layer 5 and to adjust optical characteristics of the optical recording disc 1 so that the difference in the reflectivity between a recorded portion and an unrecorded portion of the recording layer is increased by a multiple interference effect when data are reproduced, whereby a reproduced signal having a high C/N ratio can be obtained.

The material for forming the second dielectric layer 4 is not particularly limited and it is preferable to form the second dielectric layer 4 of oxide, nitride, sulfide or fluoride containing at least one metal selected from a group consisting of Si, Zn, Al, Ta, Ti, Co, Zr, Pb, Ag, Sn, Ca, Ce, V, Cu, Fe, and Mg, or a combination thereof.

The second dielectric layer 4 can be formed on the reflective layer 3 by a gas phase growth process using chemical species containing elements for forming the second dielectric layer 4. Illustrative examples of the gas phase growth processes include vacuum deposition process, sputtering process and the like.

As shown in FIG. 2, the recording layer 5 is formed on the surface of the second dielectric layer 4.

The recording layer 5 is formed of a phase change material and data are recorded in the recording layer 5 and data are reproduced from the recording layer 5 utilizing the difference in reflectivity between when the phase change material is in a crystalline phase and when it is in an amorphous phase.

When data are to be recorded in the recording layer 5, a laser beam whose power is modulated by a pulse train pattern including a unit pulse train pattern having levels corresponding to a recording power Pw and a bottom power Pb is projected onto the recording layer 5 and a region of the recording layer 5 irradiated with the laser beam is heated to a temperature equal to or higher than the melting point of the phase change material. The power of the laser beam is then set to the bottom power Pb, thereby quickly cooling the region of the recording layer 5 irradiated with the laser beam and the region is changed to an amorphous state, thereby forming a recording mark.

On the other hand, when data recorded in the recording layer 5 is to be erased, the power of the laser beam is modulated by a pulse train pattern having a level corresponding to an erasing power in addition to the levels corresponding to the recording power Pw and a bottom power Pb, thereby heating a region of the recording layer 5 irradiated with the laser beam to temperature equal to or higher than the crystallization temperature of the phase change material and the amorphous region is changed to a crystalline region, thereby erasing a recording mark.

The material for forming the recording layer 5 is not particularly limited and in this embodiment, a phase change material represented by a general formula: $Sb_aTe_bGe_cTb_d$. In the general formula, it is preferable that a is equal to or larger than 63 and equal to or smaller than 78, c is equal to or larger than 2 and equal to or smaller than 10, d is equal to or larger than 3 and equal to or smaller than 15, (a+d) is equal to or larger than 75 and equal to or smaller than 82 and a/b is equal to or larger than 3.3 and equal to or smaller than 4.9.

The phase change material represented by the general formula: $Sb_aTe_bGe_cTb_d$ changes from an amorphous phase to a crystalline phase in an extremely short time, namely, has an extremely high crystallization speed and, therefore, data can be recorded in the recording layer and data recorded in the recording layer can be erased at an extremely high linear recording velocity, for example, a linear recording velocity equal to or higher than about 19 m/sec.

Further, since the phase change material represented by the general formula: $Sb_aTe_bGe_cTb_d$ has a high crystallization temperature at which it changes from an amorphous phase to a crystalline phase, the thermal stability thereof in an amorphous phase is high.

The phase change material represented by the general formula: $Sb_aTe_bGe_cTb_d$ has such properties because it is low in Sb content and contains Tb. Tb serves to increase the crystallization speed and the crystallization temperature of the phase change material and the crystallization speed and the crystallization temperature of the phase change material can be increased by replacing a part of Sb with Tb.

It is preferable to form the recording layer 5 so as to have a thickness of 2 nm to 40 nm, more preferably to form the recording layer 5 so as to have a thickness of 4 nm to 30 nm and particularly preferably to form the recording layer so as to have a thickness of 5 nm to 20 nm.

When the thickness of the recording layer 5 is smaller than 2 nm, the difference in optical properties of the optical recording disc 1 between before and after data recording and a reproduced signal having a high C/N ratio cannot be obtained when data are reproduced. On the other hand, when the thickness of the recording layer 5 is larger than 40 nm, the amount of heat necessary for recording data increases and the recording sensitivity becomes worse, whereby it becomes hard to form a recording mark.

The recording layer 5 can be formed by a gas phase growth process using chemical species containing elements for forming the recording layer 5. Illustrative examples of the gas phase growth processes include vacuum deposition process, sputtering process and the like.

As shown in FIG. 2, the first dielectric layer 6 is formed on the surface of the recording layer 5.

The material for forming the first dielectric layer 6 is not particularly limited and it is preferable to form the first dielectric layer 6 of oxide, nitride, sulfide or fluoride containing at least one metal selected from a group consisting of Si, Zn, Al, Ta, Ti, Co, Zr, Pb, Ag, Sn, Ca, Ce, V, Cu, Fe, and Mg, or a combination thereof The first dielectric layer 6 can be formed by a gas phase growth process using chemical species containing elements for forming the first dielectric layer 6. Illustrative examples of the gas phase growth processes include vacuum deposition process, sputtering process and the like.

The first dielectric layer 6 and the second dielectric layer 4 may be formed of the same dielectric material or of different dielectric materials. Moreover, at least one of the first dielectric layer 6 and the second dielectric layer 4 may have a multi-layered structure including a plurality of dielectric films.

As shown in FIG. 2, the heat radiation layer 7 is formed on the surface of the first dielectric layer 6.

The heat radiation layer 7 serves to quickly radiate heat generated in the recording layer 5 toward the side of a light incidence plane.

In the case where heat is accumulated in the recording layer 5 when data are recorded in the recording layer 5, there arises a risk of the melted region being re-crystallized or heat interference between neighboring recording marks occurring due to the accumulated heat even after quick cooling of the recording layer 5 and this tendency becomes pronounced as the linear recording velocity increases. However, if the heat radiation layer 7 is provided, it is possible to prevent the recording layer 5 from being re-crystallized and heat interference between neighboring recording marks from occurring.

The material for forming the heat radiation layer 7 is not particularly limited insofar as it can radiate heat of the recording layer 5 but it is preferable to form the heat radiation layer 7 of a material having higher thermal conductivity than that of the material used for forming the first dielectric layer 6. Illustrative examples of the materials preferably used for forming the heat radiation layer 7 include AlN, $Al_2O_3$, SiN, ZnS, $SiO_2$ and the like.

The heat radiation layer 7 can be formed by a gas phase growth process using chemical species containing elements for forming the heat radiation layer 7. Illustrative examples of the gas phase growth processes include vacuum deposition process, sputtering process and the like.

It is preferable to form the heat radiation layer 7 so as to have a thickness of 20 nm to 150 nm.

As shown in FIG. 2, the light transmission layer 8 is formed on the surface of the hear radiation layer 7.

The light transmission layer 8 serves to transmit the laser beam.

It is required for the material for the light transmission layer 8 to be optically transparent and have a low absorption ratio and a reflectivity with respect to a laser beam having a wavelength of 350 nm to 450 nm, and a low birefringence factor. In the case where the light transmission layer 8 is formed using a spin coating method or the like, ultraviolet ray curable resin, electron beam curable resin, thermosetting resin or the like can be used for forming the light transmission layer 8 and ultraviolet ray curable resin and electron beam curable resin are most preferably used for forming the light transmission layer 8.

The light transmission layer 8 may be formed by adhering a sheet formed of light transmittable resin onto the surface of the first dielectric layer 6 using an adhesive agent.

When the light transmission layer 8 is formed using a spin coating method, the thickness thereof is preferably 1 µm to 150 µm and when the light transmission layer 8 is formed by adhering a sheet formed of light transmittable resin onto the surface of the first dielectric layer 6 using an adhesive agent, the thickness thereof is preferably 50 µm to 150 µm.

The thus constituted optical recording disc 1 has such a characteristic that the reflectivity Ri of a region in which a recording mark is formed by projecting a laser beam of a wavelength λ and whose power is set to a recording power Pw onto the recording layer 5 at an extremely high linear recording velocity equal to or higher than about 19 m/sec via an objective lens having a numerical aperture NA so as to have a length equal to or longer than λ/NA and the reflectivity Re of a region of the recording layer 5 when a recording mark formed therein is erased by projecting a laser beam having an erasing power Pe onto the region are such that Re is equal to or larger than 0.95*Ri.

Therefore, in the optical recording disc 1 according to this embodiment, it is possible to record data in the recording layer 5 at an extremely high linear recording velocity equal to or higher than about 19 m/sec and erase data recorded in the recording layer 5.

In this embodiment, data are recorded in the recording layer 5 of the optical recording disc 1 having the above identified characteristic at a high linear recording velocity equal to or higher than about 19 m/sec and a low linear recording velocity equal to or lower than about 10 m/sec.

Figure 4A:
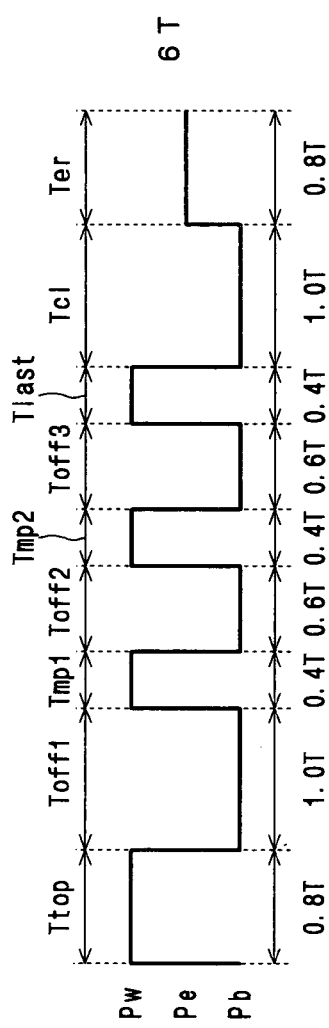
FIGS. 4(a)-(c) is a diagram showing a unit pulse train pattern used for recording data in an optical recording disc in a data recording method which is a preferred embodiment of the present invention.
Figure 4B:
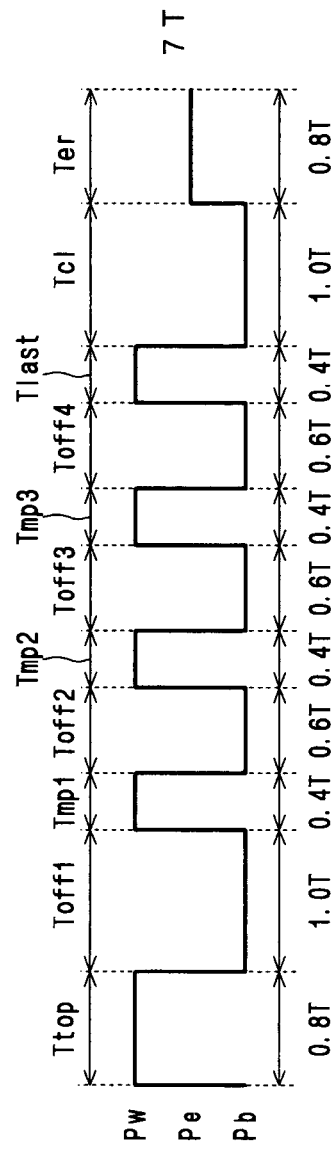
Figure 4C:
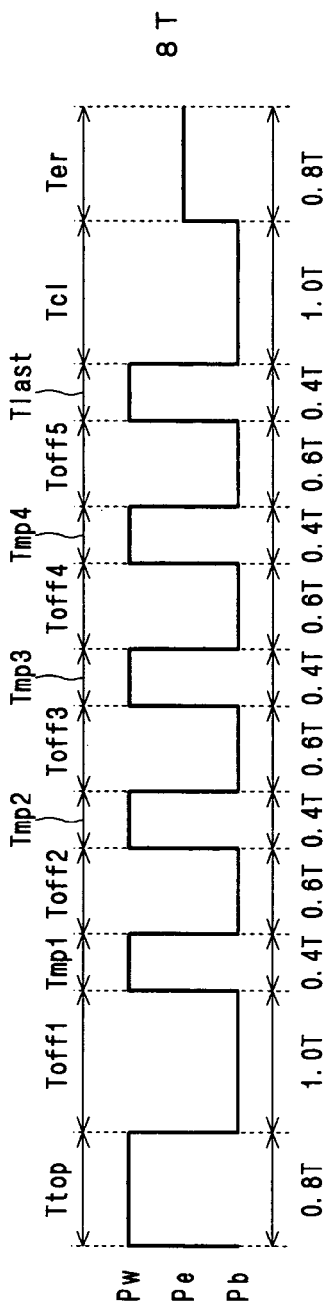

Each of FIGS. 3 and 4 is a set of diagrams showing unit pulse train patterns each used for modulating the power of a laser beam and forming one recording mark in the recording layer 5 at a high linear recording velocity of 31.8 m/sec in the method for recording data which is a preferred embodiment of the present invention. Each of FIGS. 3(*a*), 3(*b*), 3(*c*) and 3(*d*) shows a unit pulse train pattern used for forming a recording mark having any one of lengths of 2 T to 5 T in the recording layer 5 of the optical recording disc 1 and each of FIGS. 4(*a*), 4(*b*) and 4(*c*) shows a unit pulse train pattern used for forming a recording mark having any one of lengths of 6 T to 8 T in the recording layer 5 of the optical recording disc 1.

Figures 5A, 5B, 5C, 5D:
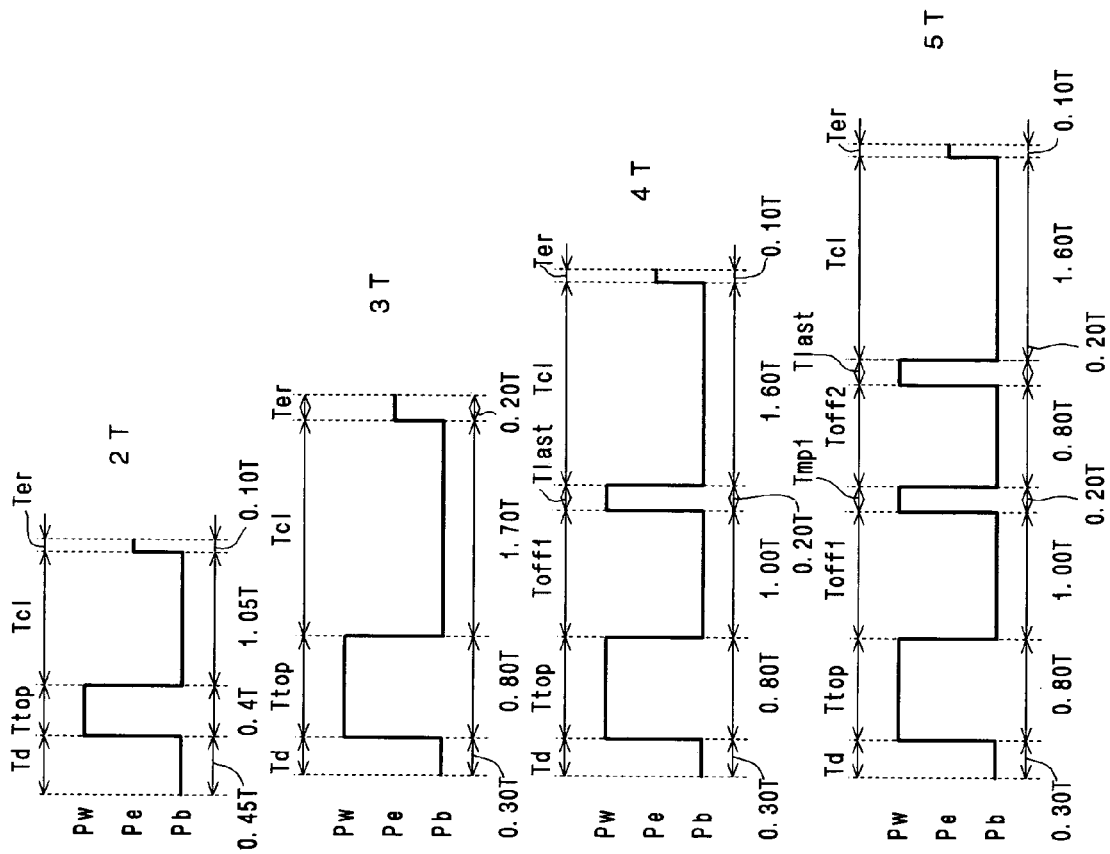
FIGS. 5(a)-(d) is a diagram showing a unit pulse train pattern used for recording data in an optical recording disc in a data recording method which is a preferred embodiment of the present invention.

Each of FIGS. 5 and 6 is a set of diagrams showing unit pulse train patterns each used for modulating the power of a laser beam and forming one recording mark in the recording layer 5 at a low linear recording velocity of 5.3 m/sec in the method for recording data which is a preferred embodiment of the present invention. Each of FIGS. 5(*a*), 5(*b*), 5(*c*) and 5(*d*) shows a unit pulse train pattern used for forming a recording mark having any one of lengths of 2 T to 5 T in the recording layer 5 of the optical recording disc 1 and each of FIGS. 6(*a*), 6(*b*) and 6(*c*) shows a unit pulse train pattern used for forming a recording mark having any one of lengths of 6 T to 8 T in the recording layer 5 of the optical recording disc 1.

As shown in FIGS. 3 to 6, in the method for recording data according to this embodiment, each of the unit pulse train patterns includes pulses whose levels are modulated between three levels, namely, a level corresponding to a recording power Pw, a level corresponding to a bottom power Pb and a level corresponding to an erasing power Pe. The recording power Pw, the bottom power Pb and the erasing power Pe satisfy Pw>Pe>Pb and the three levels are determined correspondingly.

In this specification, a pulse whose level is raised to a level corresponding to the recording power Pw is referred to as "a recording pulse", a pulse whose level is lowered to a level corresponding to the bottom power Pb is referred to as "a bottom pulse" and a pulse whose level is raised to a level corresponding to the erasing power Pe is referred to as "an erasing pulse."

As shown in FIGS. 3 and 4, in this embodiment, in the case where data are to be recorded in the recording layer 5 of the optical recording disc 1 at a high linear recording velocity of 21.0 m/sec, a unit pulse train pattern used for forming a recording mark having a length of 3 T is determined so that the pulse width Ttop of a recording pulse included therein is set to 0.8 T, a unit pulse train pattern used for forming a recording mark having a length of 4 T is determined so that the pulse widths Ttop and Tlast of recording pulses included therein are set to 0.8 T and 0.4 T, respectively, and a unit pulse train pattern used for forming a recording mark having a length of one of 5 T to 8 T is determined so that the pulse widths Ttop, Tm and Tlast of recording pulses included therein are set to 0.8 T, 0.4 T and 0.4 T, respectively. Thus, except for the unit pulse train pattern used for forming a recording mark having a length of 2 T, the plurality of kinds of unit pulse train patterns used for forming recording marks having different lengths are determined so that corresponding recording pulses included therein have common lengths.

On the other hand, in this embodiment, in the case where data are to be recorded in the recording layer 5 of the optical recording disc 1 at a high linear recording velocity of 21.0 m/sec, the pulse lengths Tcl of last bottom pulses included at the ends of all of the plurality of kinds of unit pulse train patterns used for forming recording marks having different lengths other than the unit pulse train pattern used for forming a recording mark having a length of 2 T are determined depending upon the lengths of recording marks to be formed so that the pulse length of the last bottom pulse of the unit pulse train pattern used for forming a recording mark having a length of 3 T is set to 1.5 T, that of the unit pulse train pattern used for forming a recording mark having a length of 4 T or 5 T is set to 1.1 T and that the unit pulse train pattern used for forming a recording mark having a length of 6 T, 7 T or 8 T is set to 1.0 T Further, in this embodiment, as shown in FIGS. 5 and 6, in the case where data are to be recorded in the recording layer 5 of the optical recording disc 1 at a low linear recording velocity of 5.3 m/sec, the pulse widths Ttop, Tm and Tlast of recording pulses included in the unit pulse train patterns other than the unit pulse train pattern used for forming a recording mark having a length of 2 T are set to 0.8 T, 0.2 T and 0.2 T, respectively, and two or more kinds of unit pulse train patterns used for forming recording marks having different lengths other than the unit pulse train pattern used for forming a recording mark having a length of 2 T are determined so that corresponding recording pulses included therein have common lengths.

On the other hand, in this embodiment, in the case where data are to be recorded in the recording layer 5 of the optical recording disc 1 at a low linear recording velocity of 5.3 m/sec, the pulse lengths Tcl of last bottom pulses included at the ends of the plurality of kinds of unit pulse train patterns used for forming recording marks having different lengths other than the unit pulse train pattern used for forming a recording mark having a length of 2 T are determined depending upon the lengths of recording marks to be formed so that the pulse length of the last bottom pulse of the unit pulse train pattern used for forming a recording mark having a length of 3 T is set to 1.70 T, that of the unit pulse train pattern used for forming a recording mark having a length of 4 T or 5 T is set to 1.60 T, that of the unit pulse train pattern used for forming a recording mark having a length of 6 T is set to 1.55 T and that the unit pulse train pattern used for forming a recording mark having a length of 7 T or 8 T is set to 1.50 T.

In a study done by the inventors of the present invention, it was found that in the case where the power of a laser beam was modulated by a pulse train pattern including a combination of unit pulse train patterns determined so that in the unit pulse train patterns other than the unit pulse train pattern used for forming a recording mark having a length of 2 T the corresponding recording pulses included therein had common pulse lengths Ttop, Tm and Tlast and each of them included a last bottom pulse having the pulse width Tcl determined in accordance with the length of a recording mark to be formed at the end thereof and the thus power-modulated laser beam was projected onto the recording layer 5 of the optical recording disc 1, thereby recording data therein, jitter of a reproduced signal could be markedly reduced even when data were recorded in the recording layer 5 of the optical recording disc 1 at a low linear recording velocity of 5.3 m/sec.

Although it is not necessarily clear why jitter of a reproduced signal can be markedly reduced even when data are recorded in the recording layer 5 of the optical recording disc 1 at a low linear recording velocity of 5.3 m/sec, it is reasonable to assume that this is because in the case where a laser beam is modulated by a pulse train pattern including the unit pulse train patterns determined so that the pulse widths Tcl of bottom pulses included at the end thereof are determined depending upon the lengths of recording marks to be formed and the thus power-modulated laser beam is projected onto the recording layer 5 of the optical recording disc 1 to form recording marks having different lengths, thereby recording data therein, even when data are recorded at a low linear recording velocity in the optical recording disc 1 designed to be suitable for recording data therein at a high linear recording velocity, the heating of the recording layer 5 of the optical recording disc 1 caused by projecting the laser beam whose power is modulated by the recording pulses having a level corresponding to the recording power Pw and the cooling of the recording layer 5 of the optical recording disc 1 caused by projecting the laser beam whose power is modulated by the last bottom having a level corresponding to the bottom power Pb are properly balanced and, as a result, recording marks having desired sizes can be formed in the recording layer 5 of the optical recording disc 1.

Therefore, in this embodiment, even when even when data are recorded at a low linear recording velocity in the recording layer 5 of the optical recording disc 1 designed to be suitable for recording data therein at a high linear recording velocity, jitter of a reproduced signal can be markedly reduced.

Further, as shown in FIGS. 3 to 6, in this embodiment, each of the unit pulse train patterns other than the unit pulse train pattern used for forming a recording mark having a length of 2 T is determined so that the shorter a recording mark to be formed is, the longer the pulse width Tcl of the last bottom pulse is set.

In the case where a recording mark to be formed is short, since the number of recording pulses included in the unit pulse train pattern is small, the amount of heat applied to the recording layer 5 of the optical recording disc 1 becomes small and the melted region tends to become small. However, in this embodiment, since the unit pulse train pattern is determined in such a case so that the pulse width of the last bottom pulse included at the end thereof is longer, the melted region of the recording layer 5 can be quickly cooled to prevent the melted region from being recrystallized and, therefore, it is possible to form a recording mark in a desired manner.

On the other hand, in the case where a recording mark to be formed is long, since the number of recording pulses included in the unit pulse train pattern is large, the amount of heat applied to the recording layer 5 of the optical recording disc 1 becomes large and the melted region tends to become great. However, in this embodiment, since the unit pulse train patterns other than the unit pulse train pattern used for forming a recording mark having a length of 2 T are determined in such a case so that the pulse width of the last bottom pulse included at the end thereof is shorter, recrystallization of a melted region spreading over a broader area than the recording mark to be formed is promoted, thereby adjusting the final size of the region whose phase is to be changed to the amorphous phase. As a result, it is possible to form a recording mark in a desired manner.

Therefore, according to this embodiment, it is possible to form recording marks in a desired manner irrespective of the lengths of recording marks and markedly reduce jitter of a reproduced signal.

Further, as shown in FIGS. 3 to 6, in this embodiment, the unit pulse train pattern used for forming a recording mark having a length of 2 T or 3 T includes one recording pulse, the unit pulse train pattern used for forming a recording mark having a length of 4 T includes two recording pulses, the unit pulse train pattern used for forming a recording mark having a length of 5 T includes three recording pulses, the unit pulse train pattern used for forming a recording mark having a length of 6T includes four recording pulses, the unit pulse train pattern used for forming a recording mark having a length of 7 T includes five recording pulses, and the unit pulse train pattern used for forming a recording mark having a length of 8 T includes six recording pulses.

In other words, in this embodiment, the unit pulse train patterns other than the unit pulse train pattern used for forming a recording mark having a length of 2 T are determined so as to include a recording pulse(s) in a number corresponding to the length of the recording mark to be formed and include (n−2) recording pulses when a recording mark having a length equal to n times the clock frequency T, where n is a positive integer, is to be formed.

In a study done by the inventors of the present invention, it was found that in the case where the power of a laser beam was modulated by a pulse train pattern including a combination of unit pulse train patterns determined so that in the unit pulse train patterns other than the unit pulse train pattern used for forming a recording mark having a length of 2 T the corresponding recording pulses included therein had common pulse lengths Ttop, Tm and Tlast and each of them included a last bottom pulse having the pulse width Tcl determined in accordance with the length of a recording mark to be formed at the end thereof and included (n−2) recording pulses when a recording mark having a length equal to n times the clock frequency T and the thus power-modulated laser beam was projected onto the recording layer 5 of the optical recording disc 1, thereby recording data therein, even when data were recorded using the unit pulse train pattern including the same number of recording pulses irrespective of a linear recording velocity, a reproduced signal having low jitter could be obtained.

It is reasonable to assume that this is because in the case where the unit pulse train patterns other than the unit pulse train pattern used for forming a recording mark having a length of 2 T include (n−2) recording pulses when a recording mark having a length equal to n times the clock frequency T is to be formed, data can be recorded at a high linear recording velocity in the recording layer 5 of the optical recording disc 1 while preventing the amount of heat applied to a region of the recording layer 5 in which a recording mark is to be formed from running short and data can be recorded at a low linear recording velocity in the recording layer 5 of the optical recording disc 1 while preventing the amount of heat applied to a region of the recording layer 5 in which a recording mark is to be formed from becoming excessive.

Therefore, in this embodiment, it is unnecessary to change the number of recording pulses included in the unit pulse train pattern in accordance with a linear recording velocity and even in the case where the linear recording velocity differs greatly depending upon the position of the laser beam projected onto the optical recording disc 1. For example, in the case where the optical recording disc 1 is rotated at a constant angular velocity, it is unnecessary to change the number of recording pulses included in the unit pulse train pattern. Therefore, since it is unnecessary to conduct processing for changing the number of recording pulses included in the unit pulse train pattern, the configuration of a circuit for controlling the pulse train pattern can be simplified.

Moreover, in this embodiment, in the case where data are recorded in the recording layer 5 of the optical recording disc 1 at a low linear recording velocity, since data can be recorded in the recording layer 5 by projecting a laser beam whose power is modulated in accordance with a pulse train pattern including a unit pulse train pattern having the same number of recording pulses as those in the case where data are recorded at a high linear recording velocity, it is possible to effectively apply heat to a region of the recording layer 5 in which a recording mark is to be formed and, therefore, the recording power Pw of the laser beam can be set to a low level when data are recorded in the recording layer 5 of the optical recording disc 1 at a low linear recording velocity.

Further, as shown in FIGS. 5 and 6, in this embodiment, in the case where data are to be recorded in the recording layer 5 of the optical recording disc 1 at a low linear recording velocity of 5.3 m/sec, a bottom pulse whose pulse width is 0.45 T is inserted at the foremost portion of the unit pulse train pattern for forming a recording mark having a length of 2 T and a bottom pulse whose pulse width is 0.30 T is inserted at the foremost portion of the unit pulse train pattern for forming a recording mark having a length of one of 3 T to 8 T, whereby the timing of the rising of the foremost recording pulse is delayed.

Specifically, in the case where data are to be recorded in the recording layer 5 of the optical recording disc 1 at a low linear recording velocity of 5.3 m/sec, although excessive heat is liable to be applied to the recording layer 5 and recording marks tend to be deformed due to heat interference between neighboring recording marks, in this embodiment, this can be prevented by delaying the timing of the rising of the foremost recording pulse.

FIG. 7 is a block diagram of a data recording and reproducing apparatus which is a preferred embodiment of the present invention.

As shown in FIG. 7, the data recording and reproducing apparatus 20 according to this embodiment includes a spindle motor 22 for rotating the optical recording disc 1, a pick-up 23 for emitting a laser beam toward the optical recording disc 1 and receiving the laser beam reflected by the optical recording disc 1, a controller 24 for controlling the spindle motor 22 and the pick-up 23 and effecting predetermined signal processing on data input from the outside and data reproduced from the optical recording disc 1, a laser driving circuit 25 for feeding a laser driving signal to the pick-up 23, and a lens driving circuit 26 for feeding a lens driving signal to the pick-up 23.

As shown in FIG. 7, the controller 24 includes a focus servo circuit 27 for generating a focus control signal based on a focus error signal read from the optical recording disc 1, a tracking servo circuit 28 for generating a tracking control signal based on a tracking error signal read from the optical recording disc 1, a clock generating circuit 29 for generating a clock signal based on a signal reproduced from the optical recording disc 1 and outputting it to a timing controller 31 described later or a control circuit 32, an address decoder 30 for picking up a wobble signal from a signal reproduced from the optical recording disc 1 and effecting demodulation processing on the thus picked up wobble signal to generate an address signal, a timing controller 31 for generating timing signals based on the clock signal generated by the clock generating circuit 29 and the address signal generated by the address decoder 30 and outputting them to respective circuits in the controller 24, a control circuit 32 for controlling the overall operation of the controller 24, a memory 33, a data processing circuit 34, and a recording strategy circuit 35.

The operation timings of the respective circuits in the controller 24 are controlled by outputting timing signals generated by the timing controller 31 so that they operate synchronously.

The memory 33 stores program data for controlling the overall operation of the data recording and reproducing apparatus 20, various data used for processing effected in the controller 24 and the like. In this embodiment, the memory 33 stores a plurality of recording strategies used for modulating the power of a laser beam so as to be associated with the respective kinds of optical recording discs 1.

The control circuit 32 is adapted for controlling the overall operation of the controller 24 and outputting control signals to the respective circuits in the controller 24 in accordance with command data corresponding to key input or button input by the user to control the operations thereof. Further, when it is instructed to change the linear recording velocity by the user, the control circuit 32 outputs an instruction signal for changing the number of revolutions to the spindle motor 22, thereby causing it to change the linear recording velocity.

The data processing circuit 34 serves as an encoder for encoding user data input from the outside when data are recorded in the optical recording disc 1 and serves as a decoder for decoding a signal reproduced from the optical recording disc 1 when data are reproduced from the optical recording disc 1.

The recording strategy circuit 35 generates a laser beam power control signal for modulating the power of the laser beam based on data encoded by the data processing circuit 34.

The thus constituted data recording and reproducing apparatus 20 records data in the recording layer 5 of the optical recording disc 1 in the following manner.

When the optical recording disc 1 is set in the data recording and reproducing apparatus 20, the controller 24 first projects a laser beam onto the optical recording disc 1 and reads the laser beam reflected by the optical recording disc 1 to generate a tracking error signal and a focus error signal. The controller 24 then generates a tracking control signal and a focus control signal based on the tracking error signal and the focus error signal and outputs them to the pick-up 23 and the lens driving circuit 26, respectively.

As a result, the position of the pick-up 23 is controlled so that the laser beam automatically follows the tracks of the optical recording disc 1 and the position of an objective lens (not shown) built in the pick-up 23 is finely adjusted so that the laser beam is focused onto the recording layer 5 of the optical recording disc 1.

Then, the address decoder 30 of the controller 24 reads a wobble signal, a pre-pit signal and the like from the optical recording disc 1 and generates an address signal to output it to the timing controller 31 or the control circuit 32. In this manner, since the address signal is output to the timing controller 31 or the control circuit 32, the controller 24 can recognize the position irradiated by the laser beam.

Further, in this embodiment, ID data for identifying the kind of the optical recording disc 1 are recorded in the optical recording disc 1 in the form of wobbles or pre-pits and the address decoder 30 of the controller 24 is constituted so as to read a wobble signal, a pre-pit signal or the like from the optical recording disc 1 to read ID data for identifying the kind of the optical recording disc 1. Based on the thus read ID data of the optical recording disc 1, recording strategy stored in the memory 33 is selected and the setting of the recording strategy circuit 35 is determined.

When the reading of the ID data has been completed, the user is allowed to input user data and the input user data are sent to the data recording and reproducing apparatus 20.

When the user data are input to the data recording and reproducing apparatus 20, encoding processing is first effected by the data processing circuit 34 on the user data.

The data processing circuit 34 effects scramble processing on the input user data and assigns parity data for error correction to the scramble processed data.

Further, the data processing circuit 34 effects 1,7RLL modulation processing and NRZI (non-return-to-zero-inverse) modulation processing on the data assigned with parity data for error correction and converts the arrangement of "0" and "1" of data into the arrangement suitable for the optical recording disc 1 to output it to the recording strategy circuit 35.

When encoded data have been output to the recording strategy circuit 35, the recording strategy circuit 35 generates a laser beam power control signal for modulating the power of the laser beam based on the encoded data.

In this embodiment, the recording strategy circuit 35 is constituted so as to generate a laser beam power control signal by combining the unit pulse train patterns shown in FIGS. 3 to 6 and, as shown in FIGS. 3 to 6, the unit pulse train patterns included in the laser beam power control signal are determined so that except for the case of the unit pulse train pattern used for forming a recording mark having a length of 2 T the corresponding recording pulses included therein have common pulse lengths Ttop, Tm and Tlast and each of them includes a last bottom pulse having the pulse width Tcl determined in accordance with the length of the recording mark to be formed at the end thereof and includes (n−2) recording pulses when a recording mark having a length equal to n times the clock frequency T is to be formed.

The laser beam power control signal generated by the recording strategy circuit 35 in this manner is output to the laser driving circuit 25, whereby the power of the laser beam emitted from the pick-up 23 is modulated and data are recorded in the recording layer 5 of the optical recording disc 1.

Thus, data are recorded in the optical recording disc 1 by the data recording and reproducing apparatus 20.

On the other hand, data recorded in the recording layer 5 of the optical recording disc 1 are reproduced by the data recording and reproducing apparatus 20 in the following manner.

When the optical recording disc 1 is set in the data recording and reproducing apparatus 20, focusing control and tracking control are first effected by the controller 24 and an address signal is generated by the address decoder 30 of the controller 24.

A laser beam whose power is set to a reproducing power is projected by the pick-up 23 onto the recording layer 5 of the optical recording disc 1, whereby data recorded in the recording layer 5 of the optical recording disc 1 are read to generate a reproduced signal.

The thus generated reproduced signal is sent to a PRML (partial-response-maximum-likelihood) processing circuit (not shown) to be subjected to waveform shaping processing and Viterbi decoding processing to be binarized.

The thus binarized data are output to the data processing circuit 34 and subjected by the data processing circuit 34 to decoding processing.

The data processing circuit 34 effects NRZI demodulation processing and 1,7RLL demodulation processing on data reproduced from the optical recording disc 1 and converts data whose arrangement was converted into the arrangement suitable for being recorded in the optical recording disc 1 by NRZI modulation processing and 1,7RLL modulation processing when data were recorded in the optical recording disc 1 into the data format before modulation.

Further, the data processing circuit 34 effects error correction processing on the data which were subjected to NRZI demodulation processing and 1,7RLL demodulation processing based on the parity data to correct errors included in the reproduced data.

Then, the data processing circuit 34 effects descramble processing on the data which were subjected to NRZI demodulation processing, 1,7RLL demodulation processing and error correction processing and converts the arrangement of the data which was converted by effecting the scramble processing on the data when the data were recorded in the optical recording disc 1 into the original arrangement.

The user data are reproduced by the controller 24 in this manner and the thus reproduced user data are output to the outside or stored in the memory 33 as reproduced data.

Thus, data recorded in the recording layer 5 of the optical recording disc 1 are reproduced by the data recording and reproducing apparatus 20.

According to this embodiment, as shown in FIGS. 3 to 6, data are recorded in the recording layer 5 of the optical recording disc 1 by modulating the power of a laser beam in accordance with a laser beam power control signal including the combination of unit pulse train patterns determined so that each of them includes a recording pulse(s) in the number corresponding to recording marks to be formed, that, except in the case of the unit pulse train pattern used for forming a recording mark having a length of 2 T, corresponding recording pulses included therein have common pulse lengths Ttop, Tm and Tlast and each of them includes a last bottom pulse having the pulse width Tcl determined in accordance with the length of a recording mark to be formed at the end thereof and the thus power-modulated laser beam is projected onto the recording layer 5 of the optical recording disc 1, thereby recording data therein. Therefore, jitter of a reproduced signal can be markedly reduced even when data are recorded at a low linear recording velocity in the recording layer 5 of the optical recording disc 1 designed to be suitable for recording data therein at a high linear recording velocity.

Further, according to this embodiment, since the unit pulse train pattern includes (n−2) recording pulses when a recording mark having a length of n times the clock frequency T is to be formed, data can be recorded at a high linear recording velocity in the recording layer 5 of the optical recording disc 1 while preventing the amount of heat applied to a region of the recording layer 5 in which a recording mark is to be formed from running short and data can be recorded at a low linear recording velocity in the recording layer 5 of the optical recording disc 1 while preventing the amount of heat applied to a region of the recording layer 5 in which a recording mark is to be formed from becoming excessive. Therefore, it is possible to form recording marks in a desired manner irrespective of the lengths of recording marks and markedly reduce jitter of a reproduced signal. Further, it is unnecessary to change the number of recording pulses included in the unit pulse train pattern in accordance with a linear recording velocity and even in the case where the linear recording velocity differs greatly depending upon the position of the laser beam projected onto the optical recording disc 1, for example, in the case where the optical recording disc 1 is rotated at a constant angular velocity, it is unnecessary to change the number of recording pulses included in the unit pulse train pattern. Therefore, since it is unnecessary to conduct processing for changing the number of recording pulses included in the unit pulse train pattern, the configuration of a circuit for controlling the pulse train pattern can be simplified.

Furthermore, according to this embodiment, in the case where data are recorded in the recording layer 5 of the optical recording disc 1 at a low linear recording velocity, since data can be recorded in the recording layer 5 by projecting a laser beam whose power is modulated in accordance with a pulse train pattern including a unit pulse train pattern having the same number of recording pulses as those in the case where data are recorded at a high linear recording velocity, it is possible to effectively apply heat to a region of the recording layer 5 in which a recording mark is to be formed and, therefore, the recording power Pw of the laser beam can be set to a low level when data are recorded in the recording layer 5 of the optical recording disc 1 at a low linear recording velocity.

WORKING EXAMPLES AND COMPARATIVE EXAMPLE

Hereinafter, working examples and a comparative example will be set out in order to further clarify the advantages of the present invention.

Working Example 1

A polycarbonate substrate having a thickness of 1.1 mm and a diameter of 120 mm was set in a sputtering apparatus and a reflective layer containing Ag, Pd and Cu at an atomic ratio of 98:1:1 and having a thickness of 100 nm was formed on the polycarbonate substrate using a sputtering process.

A second dielectric layer having a thickness of 4 nm was then formed on the reflective layer by a sputtering process using a target of a mixture of ZnS and $SiO_2$.

The mole ratio of ZnS to $SiO_2$ in the mixture of ZnS and $SiO_2$ contained in the second dielectric layer was 50:50.

Then, a recording layer containing a phase change material having an atomic composition represented by a formula: $Sb_{68.1}Te_{15.6}Ge_{3.1}Tb_{12.4}In_{0.8}$ and a thickness of 14 nm was formed on the second dielectric layer using a sputtering apparatus provided with a target of a mixture of Sb, Te, Ge, Tb and In.

Further, a first dielectric layer having a thickness of 40 nm was then formed on the reflective layer by a sputtering process using a target of a mixture of ZnS and $SiO_2$.

The mole ratio of ZnS to $SiO_2$ in the mixture of ZnS and $SiO_2$ contained in the first dielectric layer was 80:20.

Then, a heat radiation layer containing AlN as a primary component and having a thickness of 100 nm was formed on the first dielectric layer by a reactive sputtering process using a target of Al in an atmosphere of a mixed gas of Ar and $N_2$.

Finally, a resin solution prepared by dissolving an acrylic ultraviolet ray curable resin in a solvent was applied onto the surface of the heat radiation layer using a spin coating method to form a coating layer and an ultraviolet ray was projected onto the coating layer to cure the acrylic ultraviolet ray curable resin, thereby forming a light transmission layer having a thickness of 100 μm.

Thus, an optical recording disc sample was fabricated.

Further, the optical recording disc sample was set in an optical recording medium evaluation apparatus "DDU1000" (Product Name) manufactured by Pulstec Industrial Co., Ltd. and, as a laser beam for recording, a blue laser beam having a wavelength of 405 nm whose power was modulated by a pulse train pattern including unit pulse train patterns shown in FIGS. 3 and 4 was condensed using an objective lens having a numerical aperture NA of 0.85 onto the recording layer via the light transmission layer to form recording marks in the recording layer of the optical recording disc sample under the following conditions. The recording power Pw of the laser beam was set to 6.2 mW and the bottom power Pb thereof was set to 0.3 mW.

Linear recording velocity: 21.0 m/sec
Recording signal: 1,7RLL modulation signal
Recording regions: on-groove recording
Clock frequency (1 T): 3.8 nsec Then, data recorded in the recording layer of the optical recording disc sample were reproduced using the above mentioned optical recording medium evaluation apparatus and jitter of the reproduced signal was measured. When data were reproduced, a laser beam having a wavelength of 405 nm and an objective lens having a numerical aperture NA of 0.85 were used and the power of the laser beam was set to 0.44 mW.

Similarly, data were recorded in the recording layer of the optical recording disc sample while varying the recording power Pw of the laser beam up to 11.0 mW little by little. Then, the thus recorded data were reproduced and jitter of the reproduced signals was measured.

Figure 8:
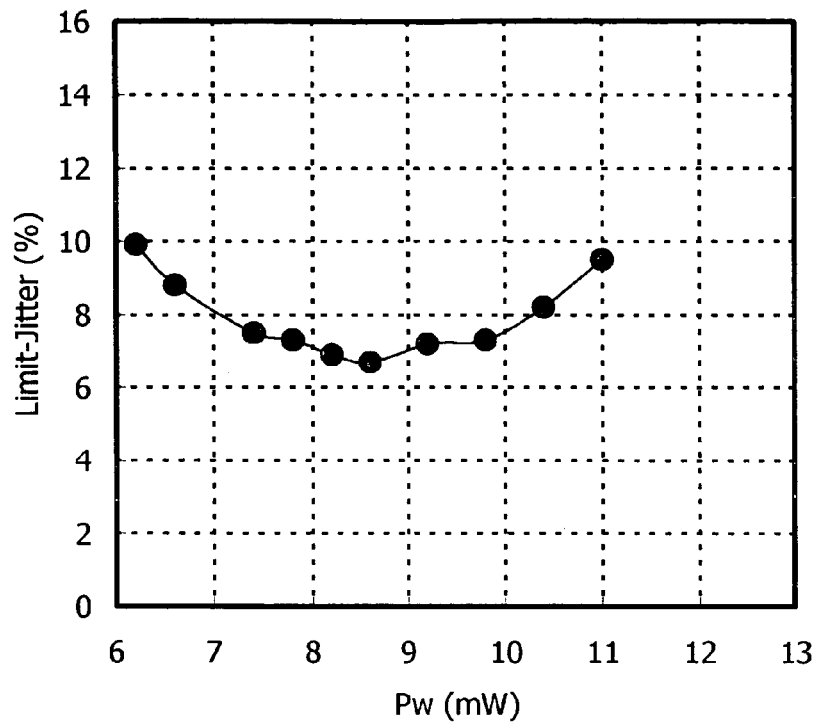
FIG. 8 is a graph showing jitter of a reproduced signal obtained by recording data in an optical recording disc using a pulse train pattern including unit pulse train patterns shown in FIGS. 3 and 4 at a linear recording velocity of 31.8 m/sec and reproducing the thus recorded data.

The results of the measurement are shown in FIG. 8.

As shown in FIG. 8, it was found that in the case where the laser beam whose power was modulated by the pulse train pattern including the unit pulse train patterns shown in FIGS. 3 and 4 was projected onto the recording layer of the optical recording disc sample, whereby data were recorded therein at a linear recording velocity of 21.0 m/sec, when the level of the recording power Pw of the laser beam was set to 7.1 mW to 10.3 mW, jitter of reproduced signals was equal to or lower than 8% and reproduced signals having low jitter could be obtained.

Working Example 2

The optical recording disc sample was set in the above mentioned optical recording medium evaluation apparatus and a blue laser beam having a wavelength of 405 nm whose power was modulated by a pulse train pattern including unit pulse train patterns shown in FIGS. 5 and 6 was condensed using an objective lens having a numerical aperture NA of 0.85 onto the recording layer via the light transmission layer to form recording marks in the recording layer of the optical recording disc sample under the following conditions. The recording power Pw of the laser beam was set to 6.3 mW and the bottom power Pb thereof was set to 0.3 mW.

Linear recording velocity: 5.3 m/sec
Recording signal: 1,7RLL modulation signal
Recording regions: on-groove recording
Clock frequency (1T): 15.2 nsec Then, data recorded in the recording layer of the optical recording disc sample were reproduced using the above mentioned optical recording medium evaluation apparatus and jitter of the reproduced signal was measured. When data were reproduced, a laser beam having a wavelength of 405 nm and an objective lens having a numerical aperture NA of 0.85 were used and the power of the laser beam was set to 0.44 mW.

Similarly, data were recorded in the recording layer of the optical recording disc sample while varying the recording power Pw of the laser beam up to 11.2 mW little by little. Then, the thus recorded data were reproduced and jitter of the reproduced signals was measured.

Figure 9:
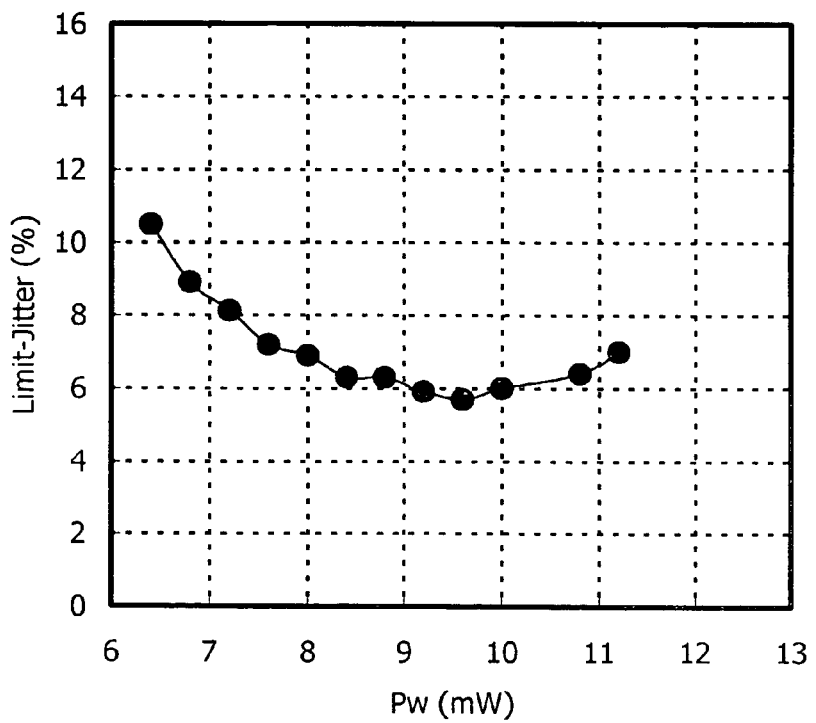
FIG. 9 is a graph showing jitter of a reproduced signal obtained by recording data in an optical recording disc using a pulse train pattern including unit pulse train patterns shown in FIGS. 5 and 6 at a linear recording velocity of 5.3 m/sec and reproducing the thus recorded data.

The results of the measurement are shown in FIG. 9.

As shown in FIG. 9, it was found that in the case where the laser beam whose power was modulated by the pulse train pattern including the unit pulse train patterns shown in FIGS. 5 and 6 was projected onto the recording layer of the optical recording disc sample, whereby data were recorded therein at a linear recording velocity of 5.3 m/sec, when the level of the recording power Pw of the laser beam was set to be equal to or higher than 7.2 mW, jitter of the reproduced signals was equal to or lower than 8% and jitter of reproduced signals could be markedly reduced.

Comparative Example 1

The optical recording disc sample was set in the above mentioned optical recording medium evaluation apparatus and a blue laser beam having a wavelength of 405 nm whose power was modulated by a pulse train pattern including unit pulse train patterns shown in Table 1 was condensed using an objective lens having a numerical aperture NA of 0.85 onto the recording layer via the light transmission layer to form recording marks in the recording layer of the optical recording disc sample under the following conditions. The recording power Pw of the laser beam was set to 7.7 mW and the bottom power Pb thereof was set to 0.3 mW.

Linear recording velocity: 5.3 m/sec
Recording signal: 1,7RLL modulation signal
Recording regions: on-groove recording
Clock frequency (1 T): 15.2 nsec

TABLE 1

| Recording mark | Number of recording pulses | Ttop | Ttmp1 | Tmp2 | Tmp3 | Tmp4 | Tmp5 | Tlast | Tcl |
|---|---|---|---|---|---|---|---|---|---|
| 2T | 1 | 0.3T | — | — | — | — | — | — | 1.40T |
| 3T | 2 | 0.3T | — | — | — | — | — | 0.25T | 1.50T |
| 4T | 3 | 0.3T | 0.2T | — | — | — | — | 0.25T | 1.50T |
| 5T | 4 | 0.3T | 0.2T | 0.2T | — | — | — | 0.25T | 1.50T |
| 6T | 5 | 0.3T | 0.2T | 0.2T | 0.2T | — | — | 0.25T | 1.50T |
| 7T | 6 | 0.3T | 0.2T | 0.2T | 0.2T | 0.2T | — | 0.25T | 1.50T |
| 8T | 7 | 0.3T | 0.2T | 0.2T | 0.2T | 0.2T | 0.2T | 0.25T | 1.50T |

Here, the pulse width Toff of a bottom pulse inserted between neighboring recording pulses was set to 0.8 T As shown in Table 1, in the unit pulse train patterns used for modulating the power of the laser beam when data were recorded in the recording layer of the optical recording disc sample, the pulse width Tcl of a last bottom pulse inserted was, unlike what is shown in FIGS. 3 to 6, set to 1.40 T when a recording mark having a length of 2 T was formed and to 1.50 T when a recording mark having a length of one of 3 T to 8 T was formed.

Further, as shown in Table 1, each of the unit pulse train patterns used for modulating the power of the laser beam when data were recorded in the recording layer of the optical recording disc sample was determined so as to include (n−1) recording pulses where nT was the length of a recording mark to be formed and n was an integer equal to or larger than 2 and equal to or smaller than 8.

Then, data recorded in the recording layer of the optical recording disc sample were reproduced using the above mentioned optical recording medium evaluation apparatus and jitter of the reproduced signal was measured. When data were reproduced, a laser beam having a wavelength of 405 nm and an objective lens having a numerical aperture of 0.85 were used and the power of the laser beam was set to 0.44 mW.

Similarly, data were recorded in the recording layer of the optical recording disc sample while varying the recording power Pw of the laser beam up to 12.4 mW little by little. Then, the thus recorded data were reproduced and jitter of the reproduced signals was measured.

Figure 10:
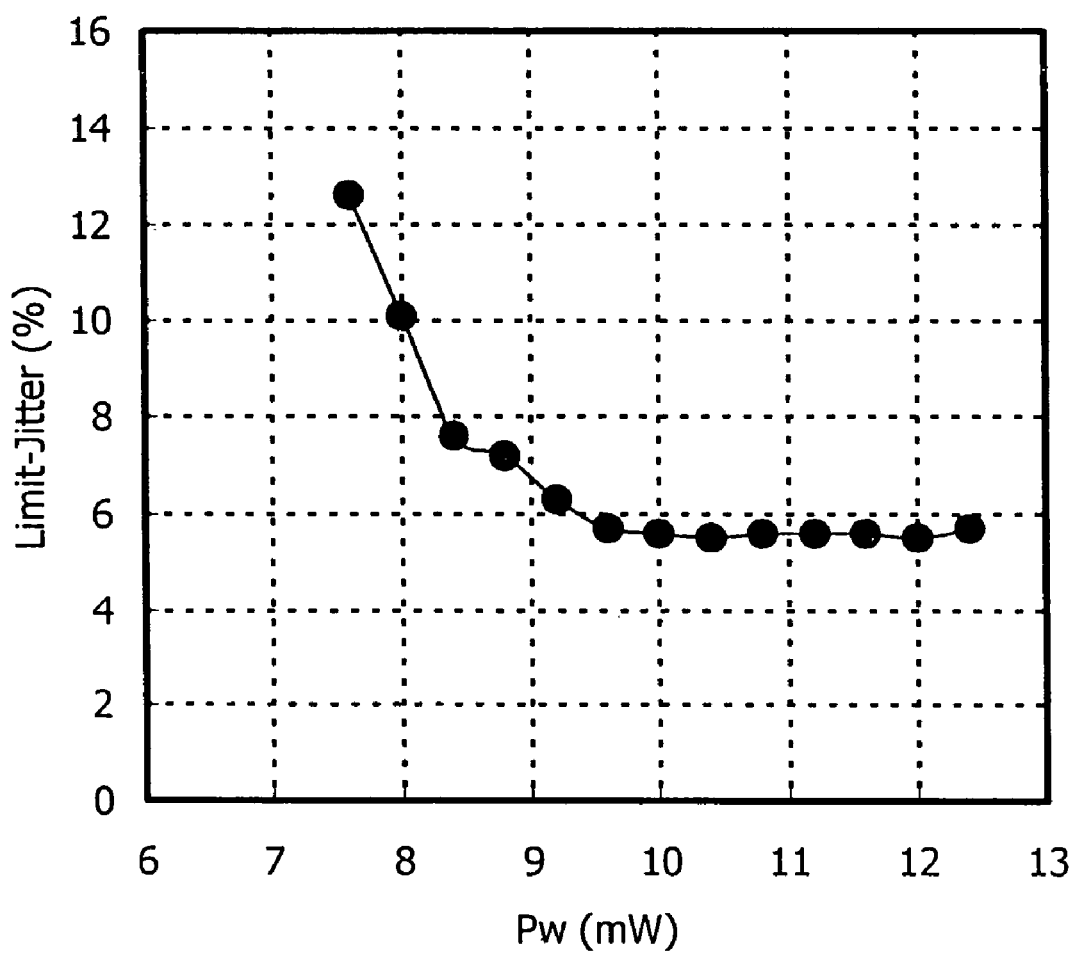
FIG. 10 is a graph showing jitter of a reproduced signal obtained by recording data in an optical recording disc at a linear recording velocity of 5.3 m/sec in accordance with Comparative Example 1 and reproducing the thus recorded data.

The results of the measurement are shown in FIG. 10.

As shown in FIGS. 9 and 10, it was found that in the case where the laser beam whose power was modulated by the pulse train pattern including the unit pulse train patterns shown in FIGS. 5 and 6 was projected onto the recording layer of the optical recording disc sample, whereby data were recorded therein at a linear recording velocity of 5.3 m/sec, jitter of reproduced signals could be reduced to be equal to or lower than 8% even if the recording power Pw of the laser beam was set to be lower in comparison with the case where data were recorded in the recording layer of the optical recording disc sample using the pulse train pattern including the unit pulse train patterns shown in Table 1.

Therefore, it was found that in the case where the laser beam whose power was modulated by the pulse train pattern including the unit pulse train patterns shown in FIGS. 5 and 6 was projected onto the recording layer of the optical recording disc sample, whereby data were recorded therein at a low linear recording velocity, the recording power Pw of the laser beam could be lowered for recording data in the recording layer of the optical recording disc sample.

The present invention has thus been shown and described with reference to the specific embodiment and the Working Examples. However, it should be noted that the present invention is in no way limited to the details of the described arrangements but changes and modifications may be made without departing from the scope of the appended claims.

For example, in the above described embodiment, the unit pulse train patterns other than the unit pulse train pattern used for forming a recording mark having a length of 2 Tare determined so that they include recording pulses in a number corresponding to the length of the recording mark to be formed, that corresponding recording mark(s) included therein have a common pulse width and that each of them includes a bottom pulse whose pulse width is determined in accordance with the length of the recording mark to be formed at the end thereof and includes (n−2) recording pulses when a recording mark having a length equal to n times a clock frequency T, and a laser beam whose power is modulated by a pulse train pattern including a combination of the thus determined unit pulse train patterns is projected onto the recording layer of the optical recording disc to record data therein. However, in order to record data in the recording layer 5 of the optical recording disc 1 and markedly reduce jitter of a reproduced signal, it is sufficient for the unit pulse train patterns to be determined so that they include recording pulses in the number corresponding to the length of the recording mark to be formed, corresponding recording pulses include therein have common pulse lengths and each of them includes a last bottom pulse having the pulse width determined in accordance with the length of a recording mark to be formed at the end thereof and it is not absolutely necessary for the unit pulse train pattern to include (n−2) recording pulses when a recording mark having a length equal to n times the clock frequency TI, where n is a positive integer, is to be formed.

Further, in the above described Working Examples, although the optical recording disc sample includes the recording layer containing the phase change material having an atomic composition represented by the formula: $Sb_{68.1}Te_{15.6}Ge_{3.1}Tb_{12.4}In_{0.8}$, the phase change material contained in the recording layer of the optical recording disc is not particularly limited.

According to the present invention, it is possible to provide a method for recording data in an optical recording disc and an apparatus for recording data therein, which can reduce jitter of a reproduced signal even when data are recorded at a low linear recording velocity in a recording layer designed to be suitable for recording data therein at a high linear recording velocity.

The invention claimed is:

1. A method for recording data in an optical recording disc including a substrate and a recording layer formed on the substrate and containing a phase change material as a primary component and constituted so that data can be recorded therein and data recorded therein can be erased by projecting thereonto at a high linear velocity equal to or higher than a predetermined linear velocity a laser beam whose power is modulated in accordance with a pulse train pattern including a plurality of kinds of unit pulse train patterns each having at least a recording pulse whose level is set to a recording power and a bottom pulse whose level is set to a bottom power onto the recording layer and forming a plurality of recording marks having different lengths in the recording layer, wherein among the plurality of kinds of unit pulse train patterns used for forming recording marks having different lengths those, other than the unit pulse train pattern used for forming the shortest recording mark, are determined so that they include recording pulses in a number corresponding to the length of the recording mark to be formed, that all corresponding recording pulses included therein have a common pulse width and that each of them includes a last bottom pulse at the end thereof whose pulse width is determined in accordance with the length of the recording mark to be formed.

2. A method for recording data in an optical recording disc in accordance with claim 1, wherein the unit pulse train patterns other than the unit pulse train pattern used for forming the shortest recording mark are determined so that the pulse width of the bottom pulse included at the end thereof is longer as the length of a recording mark to be formed is shorter.

3. A method for recording data in an optical recording disc in accordance with claim 1, wherein each of the unit pulse train patterns other than the unit pulse train pattern used for forming the shortest recording mark is determined so that when a recording mark having a length corresponding to n times a clock period T of a recording apparatus forming the recording mark, where n is a positive integer, is to be formed, it includes (n−2) recording pulses.

4. A method for recording data in an optical recording disc in accordance with claim 2, wherein each of the unit pulse train patterns other than the unit pulse train pattern used for forming the shortest recording mark is determined so that when a recording mark having a length corresponding to n times a clock period T of a recording apparatus forming the recording mark, where n is a positive integer, is to be formed, it includes (n−2) recording pulses.

5. A method for recording data in an optical recording disc in accordance with claim 1, wherein the recording layer contains as a primary component a phase change material containing Sb, Te, Ge and Tb.

6. A method for recording data in an optical recording disc in accordance with claim 2, wherein the recording layer contains as a primary component a phase change material containing Sb, Te, Ge and Tb.

7. A method for recording data in an optical recording disc in accordance with claim 3, wherein the recording layer contains as a primary component a phase change material containing Sb, Te, Ge and Tb.

8. A method for recording data in an optical recording disc in accordance with claim 4, wherein the recording layer contains as a primary component a phase change material containing Sb, Te, Ge and Tb.

9. A method for recording data in an optical recording disc in accordance with claim 1, wherein the optical recording disc has such a property that a reflectivity Ri of a region in which a recording mark is formed by projecting a laser beam of a wavelength $\lambda$ and whose power is set to a recording power Pw onto a recording layer at an extremely high linear recording velocity via an objective lens having a numerical aperture NA so as to have a length equal to or longer than $\lambda$/NA and a reflectivity Re of a region of a recording layer when a recording mark formed therein is erased by projecting a laser beam having an erasing power Pe onto the region satisfy that Re is equal to or larger than 0.95*Ri.

10. A method for recording data in an optical recording disc in accordance with claim 2, wherein the optical recording disc has such a property that a reflectivity Ri of a region in which a recording mark is formed by projecting a laser beam of a wavelength $\lambda$ and whose power is set to a recording power Pw onto a recording layer at an extremely high linear recording velocity via an objective lens having a numerical aperture NA so as to have a length equal to or longer than $\lambda$/NA and a reflectivity Re of a region of a recording layer when a recording mark formed therein is erased by projecting a laser beam having an erasing power Pe onto the region satisfy that Re is equal to or larger than 0.95*Ri.

11. A method for recording data in an optical recording disc in accordance with claim 3, wherein the optical recording disc has such a property that a reflectivity Ri of a region in which a recording mark is formed by projecting a laser beam of a wavelength $\lambda$ and whose power is set to a recording power Pw onto a recording layer at an extremely high linear recording velocity via an objective lens having a numerical aperture NA so as to have a length equal to or longer than $\lambda$/NA and a reflectivity Re of a region of a recording layer when a recording mark formed therein is erased by projecting a laser beam having an erasing power Pe onto the region satisfy that Re is equal to or larger than 0.95*Ri.

12. A method for recording data in an optical recording disc in accordance with claim 4, wherein the optical recording disc has such a property that a reflectivity Ri of a region in which a recording mark is formed by projecting a laser beam of a wavelength $\lambda$ and whose power is set to a recording power Pw onto a recording layer at an extremely high linear recording velocity via an objective lens having a numerical aperture NA so as to have a length equal to or longer than $\lambda$/NA and a reflectivity Re of a region of a recording layer when a recording mark formed therein is erased by projecting a laser beam having an erasing power Pe onto the region satisfy that Re is equal to or larger than 0.95*Ri.

13. A method for recording data in an optical recording disc in accordance with claim 1, wherein data are recorded in a recording layer of an optical recording disc by employing an objective lens and a laser beam whose numerical aperture NA and wavelength $\lambda$ satisfy $\lambda$/NA$\leq$640 nm, and projecting the laser beam onto the recording layer of the optical recording disc via the objective lens.

14. A method for recording data in an optical recording disc in accordance with claim 2, wherein data are recorded in a recording layer of an optical recording disc by employing an objective lens and a laser beam whose numerical aperture NA and wavelength $\lambda$ satisfy $\lambda$/NA$\leq$640 nm, and projecting the laser beam onto the recording layer of the optical recording disc via the objective lens.

15. A method for recording data in an optical recording disc in accordance with claim 3, wherein data are recorded in a recording layer of an optical recording disc by employing an objective lens and a laser beam whose numerical aperture NA and wavelength $\lambda$ satisfy $\lambda$/NA$\leq$640 nm, and projecting the laser beam onto the recording layer of the optical recording disc via the objective lens.

16. A method for recording data in an optical recording disc in accordance with claim 4, wherein data are recorded in a recording layer of an optical recording disc by employing an objective lens and a laser beam whose numerical aperture NA and wavelength λ satisfy λ/NA≦640 nm, and projecting the laser beam onto the recording layer of the optical recording disc via the objective lens.

17. An apparatus for recording data in an optical recording disc including a substrate and a recording layer formed on the substrate and containing a phase change material as a primary component and constituted so that data can be recorded therein and data recorded therein can be erased by projecting a laser beam thereonto at a high linear velocity equal to or higher than a predetermined linear velocity, which apparatus for recording data in an optical recording disc comprises a laser beam projecting means for projecting a laser beam whose power is modulated in accordance with a pulse train pattern including a unit pulse train pattern having at least a recording pulse whose level is set to a recording power and a bottom pulse whose level is set to a bottom power onto the recording layer of the optical recording disc, wherein among the plurality of kinds of unit pulse train patterns used for forming recording marks having different lengths those, other than the unit pulse train pattern used for forming the shortest recording mark, are determined so that they include recording pulses in a number corresponding to the length of the recording mark to be formed, that all corresponding recording marks included therein have a common pulse width and that each of them includes a last bottom pulse at the end thereof whose pulse width is determined in accordance with the length of the recording mark to be formed and the laser beam projecting means is adapted for modulating the power of the laser beam in accordance with the pulse train pattern including a combination of the thus determined unit pulse train patterns.

18. An apparatus for recording data in an optical recording disc in accordance with claim 17, wherein the unit pulse train patterns other than the unit pulse train pattern used for forming the shortest recording mark are determined so that the pulse width of the bottom pulse included at the end thereof is longer as the length of a recording mark to be formed is shorter.

19. An apparatus for recording data in an optical recording disc in accordance with claim 17, wherein each of the unit pulse train patterns other than the unit pulse train pattern used for forming the shortest recording mark is determined so that when a recording mark having a length corresponding to n times a clock period T of a recording apparatus forming the recording mark, where n is a positive integer, is to be formed, it includes (n−2) recording pulses.

20. An apparatus for recording data in an optical recording disc in accordance with claim 18, wherein each of the unit pulse train patterns other than the unit pulse train pattern used for forming the shortest recording mark is determined so that when a recording mark having a length corresponding to n times a clock period T of a recording apparatus forming the recording mark, where n is a positive integer, is to be formed, it includes (n−2) recording pulses.

* * * * *